US009378528B2

(12) United States Patent
Boldyrev et al.

(10) Patent No.: US 9,378,528 B2
(45) Date of Patent: Jun. 28, 2016

(54) METHOD AND APPARATUS FOR IMPROVED COGNITIVE CONNECTIVITY BASED ON GROUP DATASETS

(71) Applicant: Nokia Technologies Oy, Espoo (FI)

(72) Inventors: Sergey Boldyrev, Söderkulla (FI); Jari-Jukka Harald Kaaja, Järvenpää (FI); Mikko Aleksi Uusitalo, Helsinki (FI); Jan-Erik Ekberg, Vantaa (FI); Vesa-Veikko Luukkala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/652,047

(22) Filed: Oct. 15, 2012

(65) Prior Publication Data

US 2014/0106763 A1 Apr. 17, 2014

(51) Int. Cl.
*H04W 72/04* (2009.01)
*G06Q 50/00* (2012.01)
(Continued)

(52) U.S. Cl.
CPC ............ *G06Q 50/01* (2013.01); *H04W 72/048* (2013.01); *H04L 67/306* (2013.01); *H04W 4/08* (2013.01); *H04W 4/206* (2013.01)

(58) Field of Classification Search
CPC ..... H04W 72/04; H04W 28/16; H04W 28/02; H04W 28/00; H04W 28/06; H04W 4/18; H04W 12/00; H04W 16/04; H04W 60/00; H04W 74/00; H04W 72/00; H04W 76/00; H04W 4/08; H04W 4/206; H04W 72/048; H04W 72/12; H04W 72/06; H04W 72/08; H04W 72/121; H04W 4/00; H04E 16/02; G06Q 50/01; H04L 67/306; H04L 12/588

USPC ........ 455/41.2, 415–416, 418–420, 434, 448, 455/450–451, 452.1–452.2, 456.1–456.3, 455/456.5–456.6, 457, 466, 500, 507, 509, 455/514, 517–519, 556.2, 557, 560–561, 455/566; 370/328–329, 338; 705/319; 709/218–219, 226
See application file for complete search history.

(56) References Cited

U.S. PATENT DOCUMENTS 7,856,449 B1 * 12/2010 Martino .............. G06F 17/3089
707/784
7,970,912 B2 * 6/2011 Bourne ................. H04L 12/588
709/227
(Continued)

OTHER PUBLICATIONS

International Search Report for corresponding International Application No. PCT/FI2013/050939, dated Feb. 17, 2014, 6 pages.
(Continued)

*Primary Examiner* — Meless Zewdu
(74) *Attorney, Agent, or Firm* — Alston & Bird LLP

(57) ABSTRACT

An approach is provided for allocating radio resources based on social distance information for one or more social groups. The coexistence platform determines social distance information for at least one group of a plurality of one or more users, one or more devices associated with the one or more users, or a combination thereof. The coexistence platform causes, at least in part, at least one allocation of the one or more radio resources to the one or more devices based, at least in part, on the social distance information for the at least one group or a subset of the at least one group. The coexistence client causes an initiation of a request for at least one allocation of one or more radio resources. The coexistence client determines the one or more radio resources based, at least in part, on social distance information.

22 Claims, 13 Drawing Sheets

(51) Int. Cl.
*H04W 4/08* (2009.01)
*H04W 4/20* (2009.01)
*H04L 29/08* (2006.01)

(56) References Cited

U.S. PATENT DOCUMENTS

| | | | | |
|---|---|---|---|---|
| 8,682,995 | B1* | 3/2014 | Lawler | G06Q 10/10 709/207 |
| 8,700,710 | B1* | 4/2014 | Gallagher et al. | 709/204 |
| 8,843,127 | B2 | 9/2014 | Boldyrev et al. | |
| 2005/0154925 | A1* | 7/2005 | Chitrapu et al. | 713/202 |
| 2006/0009994 | A1* | 1/2006 | Hogg | G06Q 50/01 705/319 |
| 2006/0248573 | A1* | 11/2006 | Pannu et al. | 726/1 |
| 2008/0255977 | A1* | 10/2008 | Altberg et al. | 705/35 |
| 2009/0275286 | A1* | 11/2009 | Popovich et al. | 455/62 |
| 2010/0005518 | A1* | 1/2010 | Tirpak | H04L 67/306 726/6 |
| 2010/0049852 | A1* | 2/2010 | Whitnah et al. | 709/226 |
| 2010/0280892 | A1* | 11/2010 | Uzunalioglu et al. | 705/14.13 |
| 2011/0246574 | A1* | 10/2011 | Lento et al. | 709/204 |
| 2011/0258275 | A1* | 10/2011 | Rao | 709/206 |
| 2011/0270774 | A1* | 11/2011 | Varshavsky et al. | 705/319 |
| 2011/0292895 | A1* | 12/2011 | Wager et al. | 370/329 |
| 2012/0030734 | A1 | 2/2012 | Wohlert | |
| 2012/0072855 | A1* | 3/2012 | Baldwin et al. | 715/752 |
| 2012/0089698 | A1* | 4/2012 | Tseng | 709/217 |
| 2012/0110640 | A1 | 5/2012 | Donelson et al. | |
| 2012/0192258 | A1 | 7/2012 | Spencer et al. | |
| 2012/0209910 | A1* | 8/2012 | Svendsen et al. | 709/204 |
| 2013/0005374 | A1* | 1/2013 | Uusitalo et al. | 455/509 |
| 2013/0084898 | A1* | 4/2013 | Li et al. | 455/466 |
| 2013/0091214 | A1* | 4/2013 | Kellerman et al. | 709/204 |
| 2013/0091551 | A1* | 4/2013 | Rajakarunanayake et al. | 726/4 |

OTHER PUBLICATIONS

Written Opinion for corresponding International Application No. PCT/FI2013/050939, dated Feb. 17, 2014, 8 pages.

Liu et al., "Socially Inspired Spectrum Sharing in Cognitive Radio Networks", 2010 International Conference on Intelligent Computing and Integrated Systems (ICISS), Oct. 22-24, 2010, pp. 850-853.

* cited by examiner

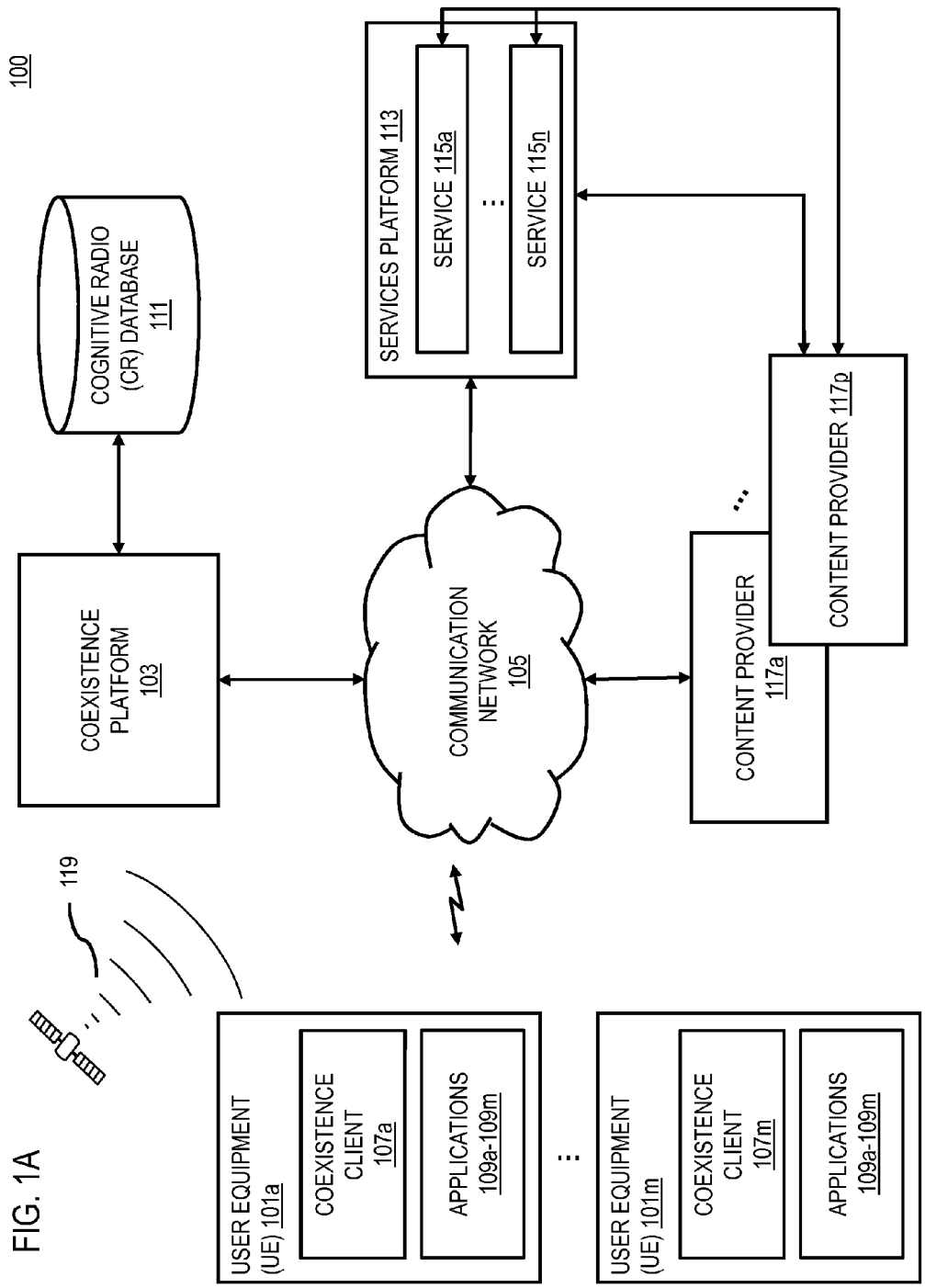

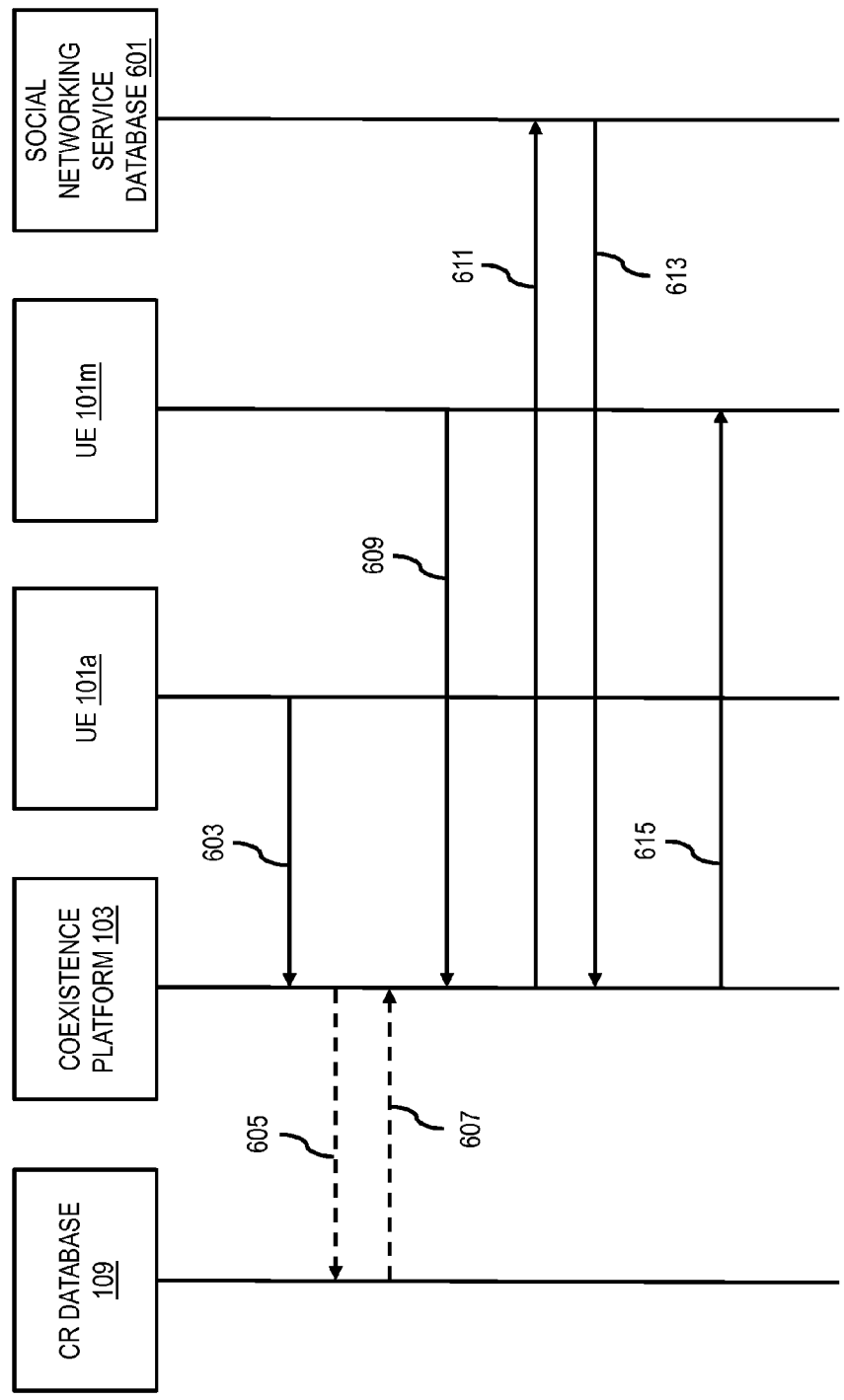

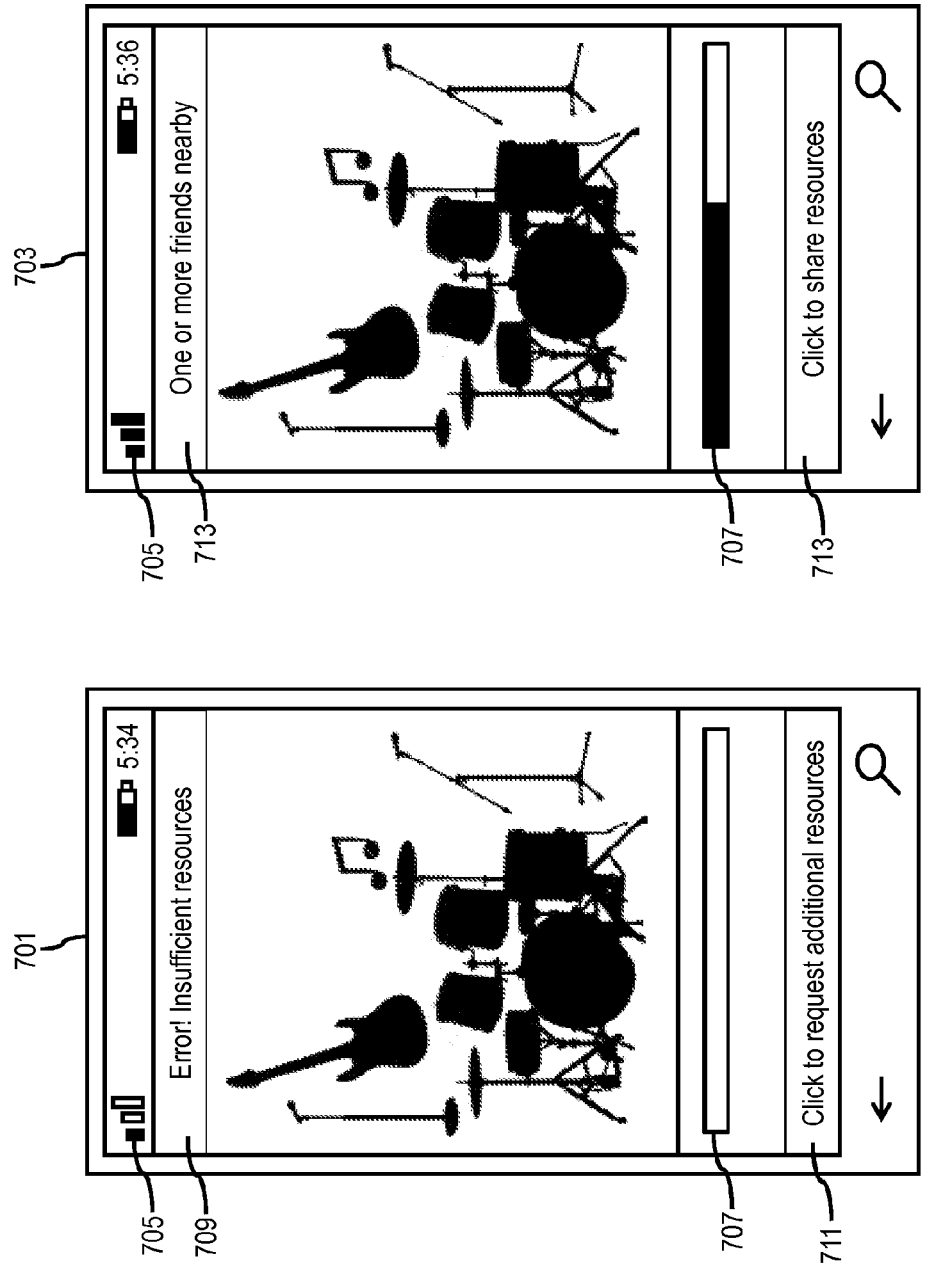

METHOD AND APPARATUS FOR IMPROVED COGNITIVE CONNECTIVITY BASED ON GROUP DATASETS

BACKGROUND

Service providers and device manufacturers (e.g., wireless, cellular, etc.) are continually challenged to deliver value and convenience to consumers by, for example, providing compelling network services. One area of interest has been the development of systems that improve and/or optimize connectivity among users (e.g., radio systems such as cognitive radio systems). Cognitive radio systems have the ability to obtain knowledge from, and become aware of both their internal and external environment (e.g., the radio environment, the service environment, and user preferences/behavior). In addition, cognitive radio systems can dynamically and autonomously adjust their behavior and operating parameters to best serve the specific needs of a user within the environment. The Internet is full of users belonging to different social groups and systems to form those groups (e.g., social networking systems). However, current cognitive systems lack the ability to make offers of resources (e.g., usable frequencies) and/or connectivity (e.g., channel reservation) based on these social groups. Accordingly, service providers and device manufacturers face significant technical challenges in providing a service that offers radio resources (e.g., spectrum, channels, bandwidth, etc.) and/or connectivity based on social groups.

SOME EXAMPLE EMBODIMENTS

Therefore, there is a need for an approach for allocating radio resources based on social distance information for one or more social groups.

According to one embodiment, a method comprises determining social distance information for at least one group of a plurality of one or more users, one or more devices associated with the one or more users, or a combination thereof. The method also comprises causing, at least in part, at least one allocation of one or more radio resources to the one or more devices based, at least in part, on the social distance information for the at least one group or a subset of the at least one group.

According to another embodiment, an apparatus comprises at least one processor, and at least one memory including computer program code for one or more computer programs, the at least one memory and the computer program code configured to, with the at least one processor, cause, at least in part, the apparatus to determine social distance information for at least one group of a plurality of one or more users, one or more devices associated with the one or more users, or a combination thereof. The apparatus also causes, at least in part, at least one allocation of one or more radio resources to the one or more devices based, at least in part, on the social distance information for the at least one group or a subset of the at least one group.

According to another embodiment, a computer-readable storage medium carries one or more sequences of one or more instructions which, when executed by one or more processors, cause, at least in part, an apparatus to determine social distance information for at least one group of a plurality of one or more users, one or more devices associated with the one or more users, or a combination thereof. The apparatus also causes, at least in part, at least one allocation of one or more radio resources to the one or more devices based, at least in part, on the social distance information for the at least one group or a subset of the at least one group.

According to another embodiment, an apparatus comprises means for determining social distance information for at least one group of a plurality of one or more users, one or more devices associated with the one or more users, or a combination thereof. The apparatus also comprises means for causing, at least in part, at least one allocation of one or more radio resources to the one or more devices based, at least in part, on the social distance information for the at least one group or a subset of the at least one group.

According to one embodiment, a method comprises causing, at least in part, an initiation of a request for at least one allocation of one or more radio resources for at least one group of a plurality of one or more users, one or more devices associated with the one or more users, or a combination thereof. The method also comprises determining the one or more radio resources based, at least in part, on social distance information for the at least one group or a subset of the least one group.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, an initiation of a request for at least one allocation of one or more radio resources for at least one group of a plurality of one or more users, one or more devices associated with the one or more users, or a combination thereof. The apparatus is also caused to determine the one or more radio resources based, at least in part, on social distance information for the at least one group or a subset of the at least one group.

According to another embodiment, a computer-readable storage medium carries one or more sequences of one or more instructions which, when executed by one or more processors, cause, at least in part, an apparatus to cause, at least in part, an initiation of a request for at least one allocation of one or more radio resources for at least one group of a plurality of one or more users, one or more devices associated with the one or more users, or a combination thereof. The apparatus is also caused to determine the one or more radio resources based, at least in part, on social distance information for the at least one group or a subset of the at least one group.

According to another embodiment, an apparatus comprises means for causing, at least in part, an initiation of a request for at least one allocation of one or more radio resources for at least one group of a plurality of one or more users, one or more devices associated with one or more users, or a combination thereof. The apparatus is also caused to determining the one or more radio resources based, at least in part, on social distance information for the at least one group or a subset of the at least one group.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side (e.g., via the computer system of FIG. 7) or on the mobile device side (e.g., via the mobile device of FIG. 9) or in any shared way between service provider and mobile device with actions being performed on both sides.

For various example embodiments, the following is applicable: An apparatus comprising means for performing the method of any of originally filed claims 1-11, 23-36, and 56-58.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of allocating radio resources based on social distance information for one or more social groups, according to one embodiment;

FIGS. 6A and 6B are ladder diagrams that illustrate a server side allocation of radio resources based on social distance information for one or more social groups, according to various embodiments;

FIG. 7 is a diagram of user interfaces utilized in the server side processes of FIGS. 3 and 4, according to various embodiments;

DESCRIPTION OF SOME EMBODIMENTS

Figure 1B:
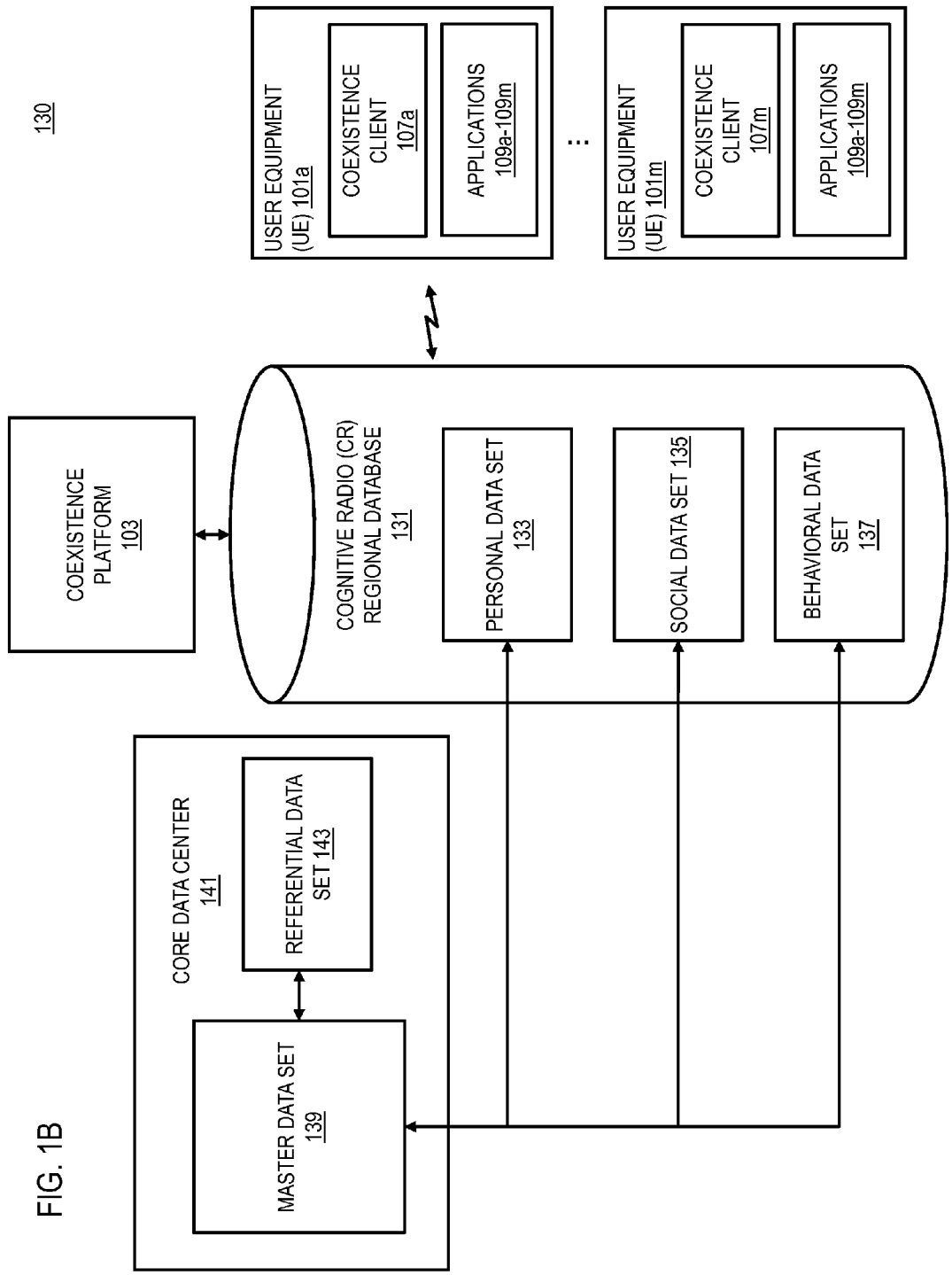
FIG. 1B is a diagram of a system also capable of allocating radio resources based on social distance information for one or more social groups, according to one embodiment.

Examples of a method, apparatus, and computer program for allocating radio resources based on social distance information for one or more social groups are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system capable of allocating radio resources based on social distance information for one or more social groups, according to one embodiment. As previously discussed, one area of interest among service providers and device manufacturers has been the development of systems that improve and/or optimize connectivity among users (e.g., radio systems such as cognitive radio systems). Cognitive radio systems have the ability to obtain knowledge from, and become aware of both their internal and external environment (e.g., the radio environment, the service environment, and user preferences/behavior). In addition, cognitive radio systems can dynamically and autonomously adjust their behavior and operating parameters to best serve the specific needs of a user within the environment. The Internet is full of users belonging to different social groups and systems to form those groups (e.g., social networking systems). In particular, connectivity providers (e.g., service providers) could benefit from these social groups by taking such groups into account in their offers of resources and/or connectivity. However, current radio systems (e.g., cognitive radio systems) lack the ability to make offers of resources (e.g., usable frequencies) and/or connectivity (e.g., channel reservation) based on these groups.

To address this problem, a system 100 of FIG. 1A introduces the capability to allocate radio resources (e.g., cognitive radio resources including, at least in part, spectrum, channels, bandwidth, etc.) based on social distance information for one or more social groups. In one embodiment, the system 100 determines social distance information for at least one group of a plurality of one or more users, one or more devices associated with the one or more users (e.g., mobile phones and/or tablets), or a combination thereof. More specifically, the system 100 can determine the social distance information based, at least in part, on a client side initiation of a request for at least one allocation of the one or more radio resources; a client side transmission of registration information, identification information, or a combination thereof associated with the one or more users, the one or more devices; or a combination thereof. By way of example, the at least one group may include members of one or more social networking services and/or one or more finite subsets within the one or more social networking services. For example, the one or more subsets may consist of one or more users on a particular social networking service that share a social relationship (e.g., family members, friends, classmates, colleagues, etc.), a common interest (e.g., music, sports, politics, religion, hobbies, etc.), a contextual similarity (e.g., at popular vacation destination, work the nightshift, nearby a particular concert venue or sports area, etc.), or a combination thereof. In particular, the system 100 can process and/or facilitate a processing of one or more lists, one or more databases, one or more group headings, etc. associated with the one or more users, the one or more social networking services, or a combination thereof to determine the one or more social groups (e.g., an athletic team's fan club). In one embodiment, it is contemplated that the system 100 can also process and/or facilitate a processing of the registration information, the identification information, or a combination thereof associated with the one or more users, the one or more devices, or a combination thereof (e.g., a name, a device identification (ID), a login and/or a password for a social networking service, etc.) to determine one or more contacts contained within a list and/or a database on the one or more devices (e.g., a mobile phone).

In one or more embodiments, the system 100 next causes, at least in part, an extraction of one or more features of the at least one group (e.g., a fan club) from one or more datasets associated with the at least one group, the one or more users, the one or more devices, or a combination thereof. By way of example, one of the main characteristics of commonality within any given group (i.e., a short social distance) is a certain feature or characteristic. More specifically, the one or more datasets determined by the system 100 from the feature extraction include, at least in part, one or more reference datasets (e.g., trend extraction), one or more social datasets (e.g., social relationships, social networking relationships, etc.), one or more personal datasets (e.g., user identity, user credentials, etc.), one or more behavioral datasets (e.g., just-in-time updates), or a combination thereof.

In one embodiment, once the system 100 extracts the one or more features, the system 100 can determine the social distance information based, at least in part, on the one or more features, the one or more datasets, or a combination thereof. In one example use case, the system 100 can determine that the social distance between two users that both identify themselves on one or more social networking services as members of the same fan club may be shorter than the social distance between two randomly selected users that may be members of the same social networking service, particularly when the membership of many social networking services is currently in the hundreds of millions.

In one or more embodiments, the system 100 also processes and/or facilitates a processing of the social distance information to determine a likelihood that the at least one group shares information (e.g., posting similar content about a band), a likelihood that the at least one group moves together (e.g., attending a concert together), a likelihood that the at least one group shares one or more network services (e.g., streaming multimedia content during the concert), or a combination thereof. By way of example, if the system 100 determines a likelihood or an affirmation of the one or more parameters (e.g., sharing information), then the system 100 determines that the social distance between the one or more users, the one or more devices, or a combination thereof is likely shorter or less than the social distance between two randomly selected users. Moreover, in one example use case, the system 100 can determine that if one device is paying for a number of other devices or one device is coordinating among a number of other devices (e.g., a short message service (SMS) broadcast), then there is likely a short social distance between the device that is paying and/or coordinating and the one or more other devices that are receiving the benefit of such actions.

In certain embodiments, the system 100, on the server side, next causes, at least in part, at least one allocation of one or more radio resources (e.g., spectrum, channels, bandwidth, etc.) to the one or more devices (e.g., a mobile phone and/or a tablet) based, at least in part, on the social distance information for the at least one group or a subset of the at least one group. For example, one or more connectivity providers (e.g., wireless service providers) can offer the one or more resources (e.g., available channels) to the at least one group, the users, or a combination thereof based, at least in part, on the social distance information. In one embodiment, the system 100, on the client side, then determines the one or more radio resources based, at least in part, on social distance information (e.g., registration information, identification information, or a combination thereof) for the at least one group or a subset of the at least one group. In one example use case, the system 100, on the client side, determines the one or more radio resources by receiving and/or detecting available spectrum, channels, bandwidth, etc. As a result, the system 100 can enable the one or more users to benefit in terms of connectivity from belonging to the at least one group (e.g., a fan club on a social networking service).

More specifically, in one embodiment, the system 100 determines contextual information associated with the at least one group, the one or more users, the one or more devices, the one or more radio resources (e.g., currently available channels), or a combination thereof, wherein the allocation is further based, at least in part, on the contextual information. In particular, the contextual information includes, at least in part, location information, movement information, temporal information, activity information, or a combination thereof. By way of example, in in one example use case, members of a particular band's fan club may want to reserve one or more resources (e.g., an available channel) at a concert, for example, to download or stream multimedia content during the concert.

In one or more embodiments, once the system 100 determines the contextual information, the system 100 causes, at least in part, a selection of at least one member of the at least one group. By way of example, the system 100 may select the at least one member that the system 100 determines has the shortest social distance (i.e., a certain quality and/or quality of social connections) with the most members of the at least one group. In one embodiment, the system 100 then causes, at least in part, a reservation of at least one allocation (e.g., an available channel) for the at least one member for sharing with one or more other members of the at least one group. By facilitating sharing of the at least one allocation, the system 100 may make channel reservation more efficient compared to allocating one channel for only one device.

In one embodiment, the system 100 can cause, at least in part, an identification of the at least one group, the one or more users, the one or more devices, or a combination thereof, wherein the allocation is further based, at least in part, on the identification. By way of example, the one or more users of the at least one group may be members of a band's fan club on one or more social networking services and are attending the band's concert at the same time. Because the system 100 determines the social distance among the at least one group is relatively short (e.g., sharing information, travel together, etc.), the system 100 can cause, at least in part, a transmission of more specific offerings to the at least one group (e.g., available channels for streaming multimedia content) relative to the general population. Moreover, in one example use case, the system 100 can determine a request for the one or more radio resources (e.g., an available channel) from at least one member of the at least one group (e.g., the fan club). In one embodiment, the system 100 can then determine that at least one other member of the at least one group already has the at least one allocation (e.g., the member of the fan club at the concert with the shortest social distance to the other members of the group). Consequently, the system 100 can cause, at least in part, a presentation of a recommendation (e.g., an SMS) for the at least one member and the at least one other member to share the at least one allocation (e.g., streaming multimedia content at different times from different devices). In particular, in one embodiment, the system 100, on the client side, determines the recommendation or request and then causes, at least in part, at least one sharing of the one or more radio resources based, at least in part, on the recommendation, the social distance information (e.g., identification information), or a combination thereof.

In one or more embodiments, the system 100 can also determine to limit an access to the one or more radio resources (e.g., spectrum, channels, bandwidth, etc.) to the at least one group, the one or more users, the one or more devices, or a combination thereof. For example, the system 100 can cause, at least in part, a transmission of one or more deals and/or offerings from one or more connectivity providers (e.g., a wireless communication provider) based, at least in part, on a membership in a fan club or a payment of a premium for the one or more radio resources (e.g., available channels). Moreover, in one example use case, the system 100 can determine that the first one hundred users, for example, of a plurality of one or more users that check-in or register (e.g., on one or more social networking services) at a particular venue (e.g., a concert) qualify for preferential treatment. As a result, the system 100 can then determine the at least one allocation based, at least in part, on the preferential treatment. Further, it is contemplated that the system 100 can also offer preferential treatment to the at least one group, the one or more users, or a combination thereof based, at least in part, on a willingness of the at least one group, the one or more users, or a combination thereof to spread out and/or share the one or more radio resources.

As shown in FIG. 1A, the system 100 comprises one or more user equipment (UE) 101a-101m (e.g., mobile phones and/or tablets) (also collectively referred to as UEs 101) having connectivity to a coexistence platform 103 via a communication network 105. The UEs 101 include a coexistence client 107 (e.g., a web browser, an operator client, or a combination thereof) and may include or be associated with one or more applications 109a-109m (also collectively referred to as applications 109). By way of example, the applications 109 may include social networking applications, an Internet browser, mapping and/or navigation applications, media applications, communication applications, etc. In one embodiment, the coexistence platform 103 is a computer system (e.g., a server) as described with respect to the FIG. 8 below.

In one embodiment, the coexistence platform 103 may include or be associated with at least one cognitive radio (CR) database 111 (e.g., a white space database). In one example embodiment, the cognitive radio database 111 may exist in whole or in part within the coexistence platform 103, or independently. More specifically, the cognitive radio database 111 may include master data (i.e., master reference data), the one or more reference datasets, the one or more social datasets, the one or more personal datasets, the one or more behavioral datasets, or a combination thereof. The cognitive radio database 111 also may include rules and relations (e.g., time, place, frequency, etc.) related to potentially usable frequencies and/or available channels. Further, the cognitive radio database 111 may also include registration information related to the UEs 101.

The UEs 101 are also connected to a services platform 113 via the communication network 105. The services platform 113 includes one or more services 115a-115n (also collectively referred to as services 115). The services 115 may include one or more service providers (e.g., licensed and unlicensed users) as well as a wide-variety of content provisioning services for the applications 109. By way of example, the content provisioning services 115 may include social networking services, mapping services, navigation services, media services, location-based services, etc. The UEs 101, the services platform 113, and the services 115 also have connectivity to one or more content providers 117a-117p (also collectively referred to as content providers 117). The content providers 117 also may provision a wide variety of content (e.g., maps, media, etc.) to the components of the system 100.

In certain embodiments, the coexistence platform 103, the coexistence client 107 and/or one or more of the applications 109 may utilize location-based technologies (e.g., global positioning system (GPS), cellular triangulation, Assisted GPS (A-GPS), etc.) to make a request to the services 115 for location-based data (e.g., a channel reservation, a channel pre-reservation, maps, etc.) based on a position relative to a UE 101. For example, a UE 101 may include a GPS receiver to obtain geographic coordinates from satellites 119 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile device, phone, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is noted that, in the various embodiments, described herein the term mobile device is used synonymously with the UEs 101, mobile terminal, mobile phone, and/or any other mobile device listed above. It is also contemplated that the UEs 101 can support any type of interface to the user (such as "wearable" circuitry, etc.). In one embodiment, the UEs 101 are mobile devices (e.g., handsets, mobile phones, etc.) as described with respect to FIG. 10 below.

In one embodiment, from the server side perspective, the coexistence platform 103 first determines social distance information for at least one group of a plurality of one or more users, one or more devices associated with the one or more users, or a combination thereof. As previously discussed, in one example use case, the at least one group may include members of one or more social networking services and/or one or more finite subsets within the one or more social networking services, etc. For example, the one or more subsets may consist of one or more users on one or more social networking services that share a social relationship, a common interest, a contextual similarity, or a combination thereof. More specifically, the coexistence platform 103 can process and/or facilitate a processing of one or more lists, one or more databases, one or more group headings, etc. associated with the one or more users, the one or more social networking services, or a combination thereof to determine the one or more social groups (e.g., an athletic team's fan club). In one embodiment, it is contemplated that the coexistence platform 103 can also process and/or facilitate a processing of one or more credentials associated with the one or more users, the UEs 101, or a combination thereof to determine one or more contacts contained within a list and/or a database on the UEs 101 (e.g., a mobile phone).

In one or more embodiments, the coexistence platform 103 next causes, at least in part, an extraction of one or more features of the at least one group (e.g., a fan club) from one or more datasets associated with the at least one group, the one or more users, the one or more devices, or a combination thereof. In particular, the one or more datasets include, at least in part, one or more reference datasets, one or more social datasets, one or more personal datasets, one or more behavioral datasets, or a combination thereof.

In one embodiment, once the coexistence platform 103 extracts one or more features, the coexistence platform 103 can determine the social distance information based, at least in part, on the one or more features, the one or more datasets, or a combination thereof. For example, the coexistence platform 103 can determine that the social distance between two users that both identify themselves as members of the same fan club on one or more social networking services may be shorter than the social distance between two randomly selected users that may be members of the same social networking service. In one or more embodiments, the coexistence platform 103 also processes and/or facilitates a processing of the social distance information to determine a likelihood that the at least one group shares information, a likelihood that the at least one group moves together, a likelihood that the at least one group shares one or more network services, or a combination thereof. For example, if the coexistence platform 103 determines a likelihood or an affirmation of the one or more parameters, then the coexistence platform 103 determines that the social distance between the one or more users, the one or more devices, or a combination thereof is likely shorter or less than the social distance between randomly selected users. Moreover, as previously discussed, in one example use case, the coexistence platform 103 can determine that if one device is paying for a number of other devices or one device is coordinating among a number of other devices (e.g., an SMS broadcast), then there is likely a short social between the device that is paying and/or coordinating and the one or more other devices that are receiving the benefit of such actions.

In certain embodiments, the coexistence platform 103 next causes, at least in part, at least one allocation of one or more radio resources (e.g., spectrum, channels, bandwidth, etc.) to the UEs 101 based, at least in part, on the social distance information for the at least one group or a subset of the at least one group. For example, one or more connectivity providers (e.g., a wireless service provider) can offer the one or more resources (e.g., available channels) to the at least one group, the users, or a combination thereof based, at least in part, on the social distance information. Consequently, the coexistence platform 103 can enable the one or more users to benefit in terms of connectivity from belonging to the at least one group (e.g., a fan club). In particular, in one embodiment, the coexistence platform 103 determines contextual information associated with the at least one group, the one or more users, the one or more devices, the one or more radio resources (e.g., currently available channels), or a combination thereof, wherein the allocation is further based, at least in part, on the contextual information. In particular, the contextual information includes, at least in part, location information, movement information, temporal information, activity information, or a combination thereof.

In one or more embodiments, once the coexistence platform 103 determines the contextual information, the coexistence platform 103 causes, at least in part, a selection of at least one member of the at least one group. For example, the coexistence platform 103 may select the at least one member that the coexistence platform 103 determines has the shortest social distance (i.e., a certain quality and/or quantity of social connections) with the most members of the at least one group. In one embodiment, the coexistence platform 103 then causes, at least in part, a reservation of at least one allocation (e.g., an available channel) for the at least one member for sharing with one or more other members of the at least one group. By facilitating a sharing of the at least one allocation, the coexistence platform 103 may make channel reservation more efficient compared to allocating one channel for only one device.

In one embodiment, the coexistence platform 103 can cause, at least in part, an identification of the at least one group, the one or more users, the one or more devices, or a combination thereof, wherein the allocation is further based, at least in part, on the identification. For example, the one or more users of the at least one group may be members of a band's fan club on one or more social networking services and are attending the band's concert at the same time. Because the coexistence platform 103 determines that the social distance among the fan club is relatively short (e.g., share information, travel as a group, etc.), the coexistence platform 103 can cause, at least in part, a transmission of more specific offerings of resources to the at least one group (e.g., available channels for streaming multimedia content) relative to the general population. In addition, in one or more embodiments, the coexistence platform 103 can determine a request for the one or more radio resources (e.g., an available channel) from at least one member of the at least one group (e.g., the fan club). In one embodiment, the coexistence platform 103 can then determine that at least one other member of the at least one group already has the at least one allocation (e.g., the member of the fan club at the concert with the shortest social distance to the other members of the group). As a result, the coexistence platform 103 can cause, at least in part, a presentation of a recommendation (e.g., an SMS) for the at least one member and the at least one other member to share the at least one allocation (e.g., streaming multimedia content at different times from different devices).

In one or more embodiments, the coexistence platform 103 can also determine to limit an access to the one or more radio resources (e.g., spectrum, channels, bandwidth, etc.) to the at least one group, the one or more users, the one or more devices, or a combination thereof. By way of example, the coexistence platform 103 can cause, at least in part, a transmission of one or more deals and/or offerings from one or more connectivity providers (e.g., a wireless communication provider) based, at least in part, on a membership in a fan club or a payment of a premium for the one or more radio services (e.g., available channels). Moreover, in one example use case, the coexistence platform 103 can determine that the first one hundred users, for example, of a plurality of one or more users that check-in or register (e.g., on one or more social networking services) at a particular venue (e.g., a concert) qualify for preferential treatment. Consequently, the coexistence platform 103 can then cause, at least in part, the at least one allocation to the UEs 101 based, at least in part, on the preferential treatment. Moreover, it is contemplated that the coexistence platform 103 can also offer preferential treatment to the at least one group, the one or more users, or a combination thereof based, at least in part, on a willingness of the at least one group, the one or more users, or a combination thereof to spread out and/or share the one or more radio resources.

In one embodiment, from the client side perspective, the coexistence client 107 causes, at least in part, an initiation of a request for at least one allocation of one or more radio resources (e.g., available spectrum, channels, bandwidth, etc.) for at least one group of a plurality of one or more users, one or more devices associated with the one or more users (e.g., a mobile phone and/or a tablet), or a combination thereof. By way of example, a user may initiate the request from his or her mobile device at an event such as a concert or sporting event, for example, where network resources (e.g., bandwidth) are constrained or limited due to the large numbers of users attempting to use the same network resources at or about the same time.

In one or more embodiments, the coexistence client 107 causes, at least in part, at least one transmission of registration information, identification information, or a combination thereof (e.g., a name, a device ID, a login and/or a password associated with a social networking service, etc.) associated with the one or more users, the one or more devices, or a combination. In particular, the at least one allocation is based, at least in part, on the registration information, the identification information, or a combination thereof. Further, the coexistence client 107, in one embodiment, then determines the one or more radio resources based, at least in part, on social distance information for the at least one group or a subset of the least one group (e.g., a degree of commonality among the at least one group or a subset of the at least one group). By way of example, the coexistence client 107 can determine the one or more radio resources by receiving and/or detecting available spectrum, channels, bandwidth, etc. In one example use case, the one or more resources may include, at least in part, exclusive or preferential access to spectrum, channels, bandwidth, etc.

In one embodiment, the coexistence client 107 can also determine at least one other request to share one or more radio resources (e.g., spectrum, channels, bandwidth, etc.) with at least one other user, at least one other device associated with the at least one other user, or a combination thereof. By way of example, the coexistence client 107 of a user device (e.g., a mobile device such as a mobile phone or a tablet) can determine the at least one other request from the coexistence platform 103 and/or another coexistence client 107 (e.g., another user requesting an available channel to stream multimedia content at the same concert). By way of example, the coexistence client 107 of the one or more devices, the at least one other device, or a combination thereof may determine an SMS message from the coexistence platform 103, for example, informing the respective users that they can share the one or more resources (e.g., an available channel) by streaming multimedia content at different times from the different devices, for example. The coexistence client 107, in certain embodiments, can then cause, at least in part, at least one sharing of the one or more radio resources based, at least in part, on the at least one other request, the social distance information, or a combination thereof.

By way of example, the UEs 101, the coexistence platform 103, the coexistence client 107, the services platform 113, the services 115, the content providers 117, and the satellites 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

As shown in FIG. 1B, a system 130 is also capable of allocating radio resources (e.g., spectrum, channels, bandwidth, etc.) based on social distance information for one or more social groups. The system 100 and the system 130 have substantially similar capabilities, however, the system 130 more specifically illustrates the location of the one or more datasets contained within the CR database 109 of the system 100. As depicted, FIG. 1B comprises the UEs 101 having connectivity to a Cognitive Radio (CR) Regional Database 131 via middle and wireless connectivity (e.g., WiFi, Bluetooth®, etc.). The CR Regional Database 131 contains a personal dataset 133 (e.g., user identity, user credentials, etc.), a social dataset 135 (e.g., social relationships, social networking relationships, etc.), and a behavioral dataset 137 (e.g., just-in-time updates), similar to the CR database 109. The personal dataset 133, the social dataset 135, and the behavioral dataset 137 are connected to a master dataset 139 contained with the Core Data Center 141. The master dataset 139 is also connected to a referential dataset 143 (e.g., trend extraction). In the system 100, in one embodiment, both the master dataset 139 and the referential dataset 143 are contained with the CR database 109. In one embodiment, the CR Regional Database 131 may be contained within wireless memory (e.g., a radio frequency (RF) memory tag (active or passive)) and accessible via an abstraction layer.

Figure 2A:
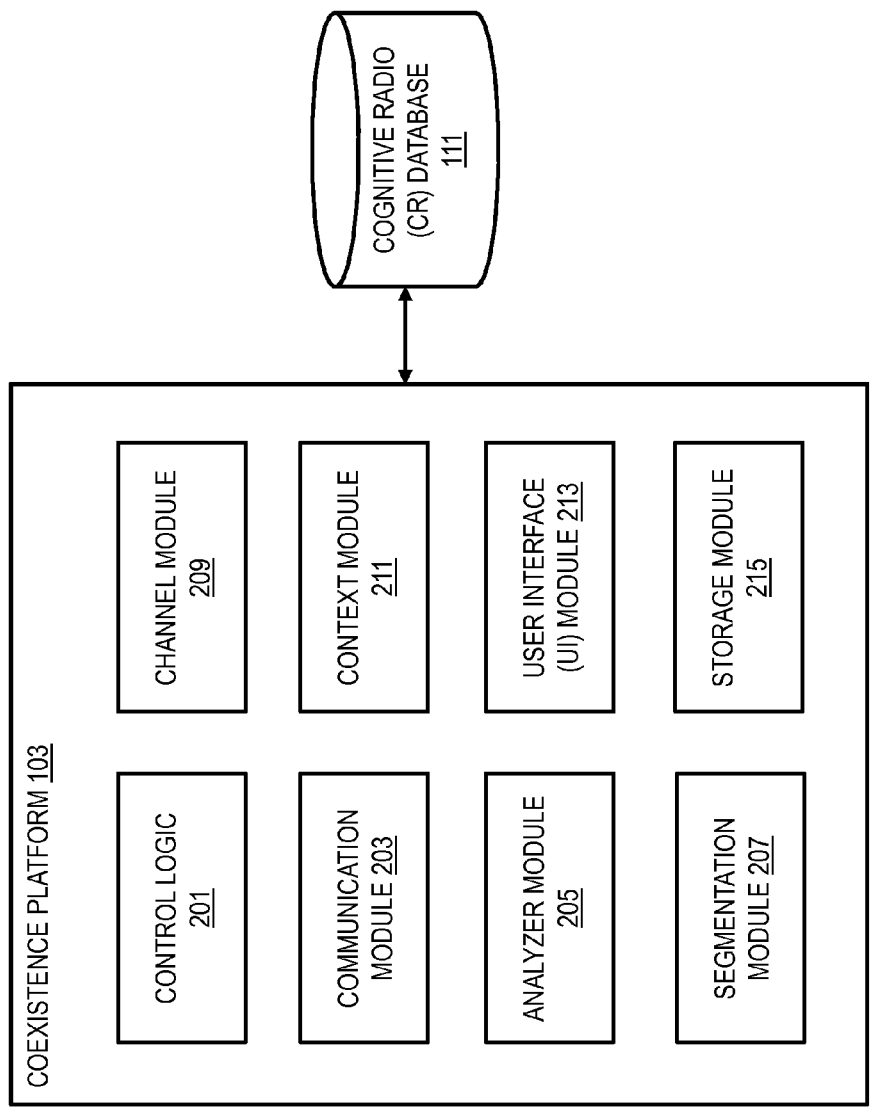
FIGS. 2A and 2B are diagrams of the components of a coexistence platform and a coexistence client, respectively, according to one embodiment.

FIG. 2A is a diagram of the components of a coexistence platform 103, according to one embodiment. By way of example, the coexistence platform 103 includes one or more server side components for allocating radio resources (e.g., spectrum, channels, bandwidth, etc.) based on social distance information for one or more social groups. It is contemplated that the functions of these components may be combined in one or more components or performed by other components of equivalent functionality. In this embodiment, the coexistence platform 103 includes a control logic 201, a communication module 203, an analyzer module 205, a segmentation module 207, a channel module 209, a context module 211, a user interface (UI) module 213, and a storage module 215.

The control logic 201 oversees tasks, including tasks performed by the communication module 203, the analyzer module 205, the segmentation module 207, the channel module 209, the context module 211, the user interface (UI) module 213, and the storage module 215. For example, although the other modules may perform the actual task, the control logic 201 may determine when and how those tasks are performed or otherwise direct the other modules to perform the task. In one embodiment, the control logic 201 may also be used to determine to limit an access to the one or more radio resources (e.g., available channels) to the at least one group (e.g., a fan club), the one or more users, the one or more devices, or a combination thereof.

The communication module 203 is used for communication between the UEs 101, the coexistence platform 103, the coexistence client 107, the applications 109, the cognitive radio database 111, the services platform 113, the services 115, the content providers 117, and the satellites 119. The communication module 203 may also be used to communicate commands, requests, data, etc. In one embodiment, the communication module 203, in connection with the UI module 213, also may be used to determine a request for the one or more radio resources from at least one member of the at least one group. Further, the communication module 203, also in connection with the UI module 213, may be used to cause, at least in part, a presentation of a recommendation (e.g., an SMS) for the at least one member and the at least one other member to share the at least one allocation.

In one embodiment, the analyzer module 205 is used to determine social distance information for at least one group of a plurality of one or more users, one or more devices associated with the one or more users, or a combination thereof. By way of example, members of the same fan club on one or more social networking services likely have a shorter social distance than two randomly selected users. The analyzer module 205 may also be used to determine the social distance information based, at least in part, on the one or more features, the one or more datasets, or a combination thereof. For example, the one or more datasets include, at least in part, one or more reference datasets (e.g., trend extraction), one or more social datasets (e.g., social relationships, social networking relationships, etc.), one or more personal datasets (e.g., user identify, user credentials, etc.), one or more behavioral datasets (e.g., just-in-time updates), or a combination thereof. The analyzer module 205 also may be used to process and/or facilitate a processing of the social distance information to determine a likelihood that the at least one group shares information (e.g., posting similar content about a band), a likelihood that the at least one group moves together (e.g., attending a concert together), a likelihood that the at least one group shares one or more network services (e.g., streaming multimedia content during the concert), or a combination thereof, wherein the at least one allocation is further based, at least in part, on the processing. In addition, the analyzer module 205, in connection with the channel module 209, may also be used to determine that at least one other member of the at least one group has the at least one allocation.

The segmentation module 207 is used to cause, at least in part, an extraction of one or more features of the at least one group from one or more datasets associated with the at least one group, the one or more users, the one or more devices, or a combination thereof. In particular, the one or more features are the main characteristic of commonality within any given group and therefore can be processed by the segmentation module 207 to determine the one or more datasets (e.g., the one or more reference datasets, the one or more social datasets, etc.). In one embodiment, the segmentation module 207, in connection with the analyzer module 205, may also be used to cause, at least in part, a selection of at least one member of the at least one group. For example, the segmentation module 207 may select the at least one member that the analyzer module 205 determines has the shorted social distance (i.e., the most social connections) with the most members of the at least one group. In addition, the segmentation module 207 also may be used to cause, at least in part, an identification of the at least one group (e.g., a fan club), the one or more user, the one or more devices, or a combination thereof, wherein the allocation is further based, at least in part, on the identification.

In one embodiment, the channel module 209 is used to cause, at least in part, at least one allocation of one or more radio resources (e.g., spectrum, channels, bandwidth, etc.) to the one or more devices based, at least in part, on the social distance information for the at least one group or a subset of the at least one group. The channel module 209 may also be used to cause, at least in part, a reservation of the at least one allocation for the at least one member for sharing with one or more other members of the at least one group. As previously discussed, the channel module 209, in connection with the analyzer module 205, also may be used to determine that at least one other member of the at least one group has the at least one allocation.

The context module 211 is used to determine contextual information associated with the at least one group, the one or more users, the one or more devices, the one or more radio resources (e.g., currently available channels), or a combination thereof, wherein the allocation is further based, at least in part, on the contextual information. More specifically, the contextual information includes, at least in part, location information, movement information, temporal information, activity information, or a combination thereof.

As previously discussed, in one embodiment, the user interface (UI) module 213, in connection with the communication module 203, is used to determine a request for the one or more radio resources (e.g., spectrum, channels, bandwidth, etc.) from at least one member of the at least one group. The UI module 213, also in connection with communication module 203, may be used to cause, at least in part, a presentation of a recommendation (e.g., an SMS) for the at least one member and the at least one other member to share the at least one allocation (e.g., streaming multimedia content at different times from different devices).

The storage module 215 is used to manage the storage of the master data (i.e., master reference data), the one or more reference datasets, the one or more social datasets, the one or more personal datasets, the one or more behavioral datasets, or a combination thereof in the cognitive radio database 111. The storage module 215 may also be used to manage the storage of the rules and relations (e.g., time, place, frequency, etc.) related to potentially usable frequencies and/or available channels as well as any registration information related to the UEs 101 stored in the cognitive radio database 111.

Figure 2B:
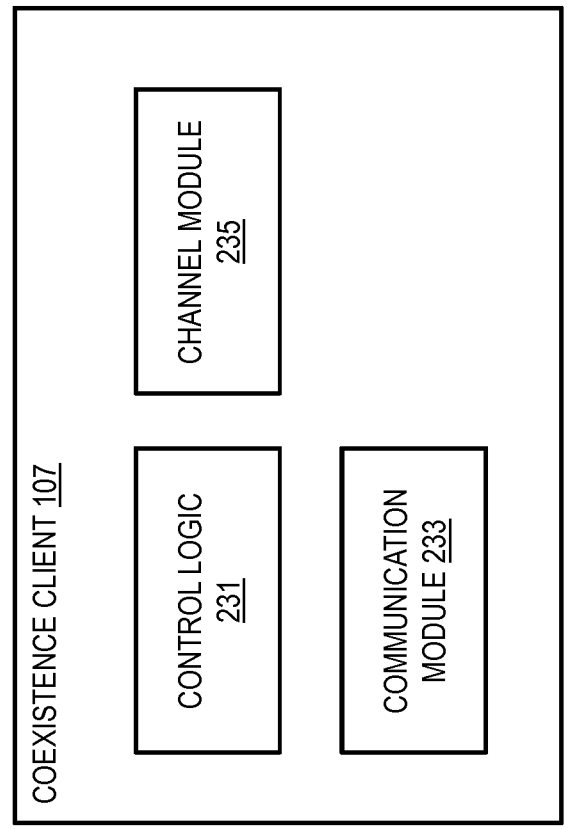

FIG. 2B is a diagram of the components of the coexistence client 107, according to one embodiment. By way of example, the coexistence client 107 includes one or more client side components for determining radio resources (e.g., receiving and/or detecting available spectrum, channels, bandwidth, etc.) based on social distance information for one or more social groups. It is contemplated that the functions of these components may be combined in one or more components or performed by other components of equivalent functionality. In this embodiment, the coexistence client 107 includes a control logic 231, a communication module 233, and a channel module 235.

Similar to the control logic 201 of the coexistence platform 103, the control logic 231 oversees tasks, including tasks performed by the communication module 233 and the channel module 235. For example, although the other modules may perform the actual task, the control logic 231 may determine when and how those tasks are performed or otherwise direct the other modules to perform the task. Further, the control logic 231, in connection with the communication module 233, may be used to cause, at least in part, at least one sharing of the one or more radio resources based, at least in part, on the at least one other request, the social distance information (e.g., the registration information, the identification information, or a combination thereof), or a combination thereof.

Similar to the communication module 203 of the coexistence platform 103, the communication module 233 the UEs 101, the coexistence platform 103, the applications 109, the cognitive radio database 111, the services platform 113, the services 115, the content providers 117, and the satellites 119. The communication module 233 may be used to communicate commands, requests, data, etc. The communication module 233 also may be used to cause, at least in part, an initiation of a request for at least one allocation of one or more radio resources (e.g., spectrum, channels, bandwidth, etc.) for at least one group of a plurality of one or more users, one or more devices associated with the one or more users (e.g., a mobile phone and/or a tablet), or a combination thereof. The communication module 233 may also be used to cause, at least in part, at least one transmission of registration information, identification information, or a combination thereof associated with the one or more users, the one or more devices, or a combination thereof to the coexistence platform 107, for example. Further, the communication module 233 also may be used to determine at least one request to share one or more radio resources with at least one other user, at least one other device associated with the at least one user, or a combination thereof. For example, the communication module 233 may determine the at least one other request when one or more users are attending the same event (e.g., a concert or sporting event), where network resources (e.g., bandwidth) are constrained or limited due to the large numbers of users attempting to use the same resources at or about the same time.

Similar to the channel module 209 of the coexistence platform 103, the channel module 235, in connection with the communication module 233, is used to determine the one or more radio resources (spectrum, channels, bandwidth, etc.) based, at least in part, on social distance information for the at least one group or a subset of the at least one group (e.g., a degree of commonality among the at least one group or the subset of the at least one group). In one example use case, the channel module 235 determines the one or more radio resources based, at least in part, on the communication module 233 receiving the one or more radio resources. By way of example, the channel module 235, in connection with the communication module 233, can cause, at least in part, a transmission of information to the channel module 209 to inform the coexistence platform 103 that a particular UE 101 (e.g., a mobile phone or a tablet) already has the at least one allocation of the one or more radio resources (e.g., an allocation of available bandwidth at a concert or sporting event).

Figure 3:
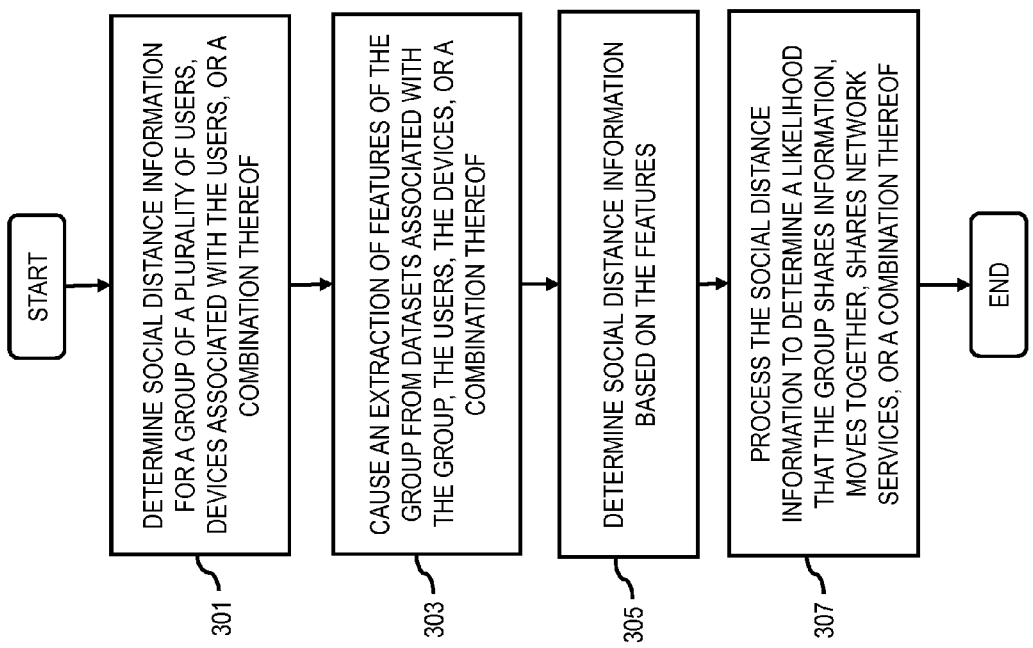
FIGS. 3 and 4 are flowcharts of server side processes for allocating radio resources based on social distance information for one or more social groups, according to one embodiment.
Figure 4:
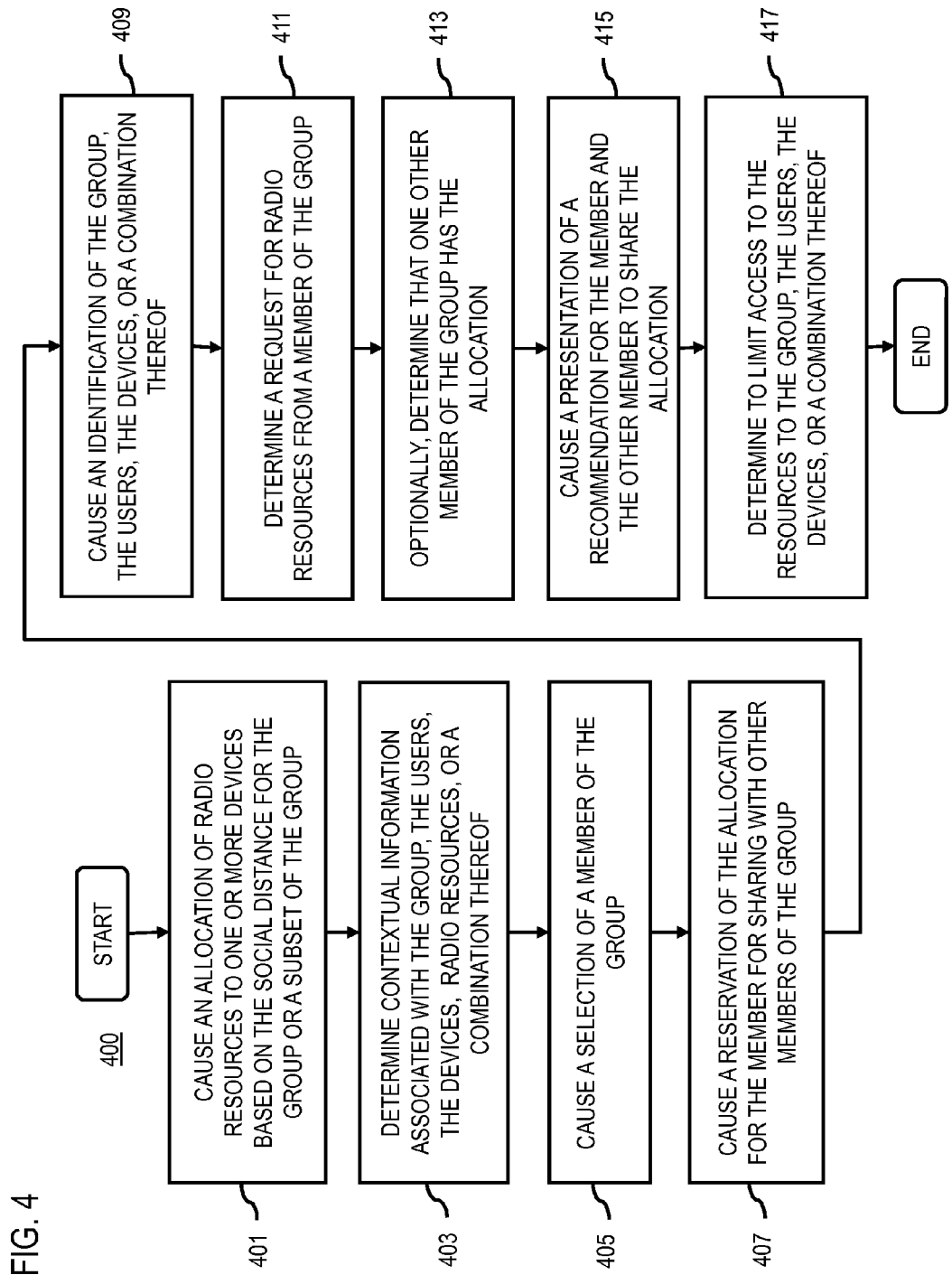
Figure 8:
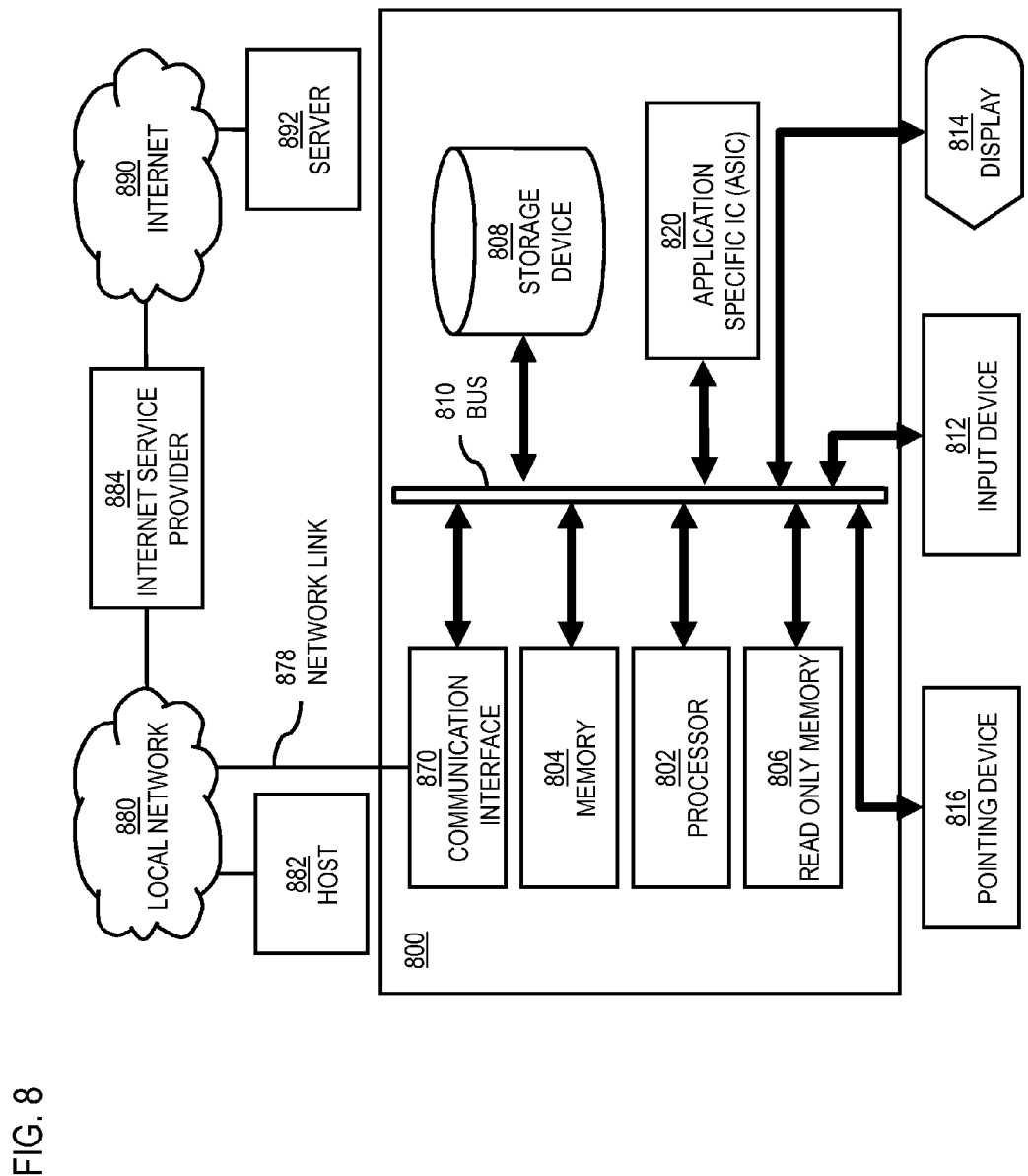
FIG. 8 is a diagram of hardware that can be used to implement an embodiment of the invention.

FIGS. 3 and 4 are flowcharts of server side processes for allocating radio resources (e.g., spectrum, channels, bandwidth, etc.) based on social distance information for one or more social groups, according to one embodiment. FIG. 3 depicts a server side process of determining social distance information. In one embodiment, the coexistence platform 103 performs the process 300 and is implemented in, for instance, a chip set including a processor and a memory as shown in FIG. 8. In step 301, the coexistence platform 103 determines social distance information for at least one group of a plurality of one or more users, one or more devices associated with the one or more users, or a combination thereof. By way of example, the social distance information includes, at least in part, a quantitative and/or qualitative analysis of the one or more social relationships among the one or more users. In particular, in one embodiment, the coexistence platform 103 determines whether the one or more users are members of one or more social networking services and/or one or more finite subsets within the one or more social networking services (e.g., a fan club). More specifically, in one example use case, the one or more subsets may consist of one or more users on a particular social networking service that share a social relationship (e.g., family members, friends, classmates, colleagues, etc.), a common interest (e.g., music, sports, politics, religion, hobbies, etc.), a contextual similarity (e.g., at popular vacation destination, work the nightshift, nearby a particular concert venue or sports area, etc.), or a combination thereof. Moreover, the coexistence platform 103 can process and/or facilitate a processing of one or more lists, one or more databases, one or more group headings, etc. associated with the one or more users, the one or more social networking services, or a combination thereof to determine the one or more social groups (e.g., an athletic team's fan club). In one embodiment, it is contemplated that the coexistence platform 103 can also process and/or facilitate a processing of one or more credentials associated with the one or more users, the one or more devices, or a combination thereof (e.g., a name, a device identification (ID), a login, a password, etc.) to determine one or more contacts contained within a list and/or a database on the one or more devices (e.g., a mobile phone).

In step 303, the coexistence platform 103 causes, at least in part, an extraction of one or more features of the at least one group from one or more datasets associated with the at least one group, the one or more users, the one or more devices, or a combination thereof. By way of example, one of the main characteristics of commonality within any given group (i.e., a short social distance) is a certain feature or characteristic. In particular, the one or more datasets determined by the coexistence platform 103 from the feature extraction include, at least in part, one or more reference datasets (e.g., trend extraction), one or more social datasets (e.g., social relationships, social networking relationships, etc.), one or more personal datasets (e.g., user identity, user credentials, etc.), one or more behavioral datasets (e.g., just-in-time updates), or a combination thereof.

In step 305, the coexistence platform 103 determines the social distance information based, at least in part, on the one or more features, the one or more datasets, or a combination thereof. As previously discussed, in one example use case, the coexistence platform 103 can determine that the social distance (e.g., the quantity and/or quality of social connections) between two users that both identify themselves on one or more social networking services as members of the same fan club may be shorter than the social distance between two randomly selected users that may be members of the same social networking services, particularly when the membership of many social networking services is currently in the hundreds of millions.

In step 307, the coexistence platform 103 processes and/or facilitates a processing of the social distance information to determine a likelihood that the at least one group shares information, a likelihood that the at least one group moves together, a likelihood that the at least one group shares one or more network services, or a combination thereof, wherein the at least one allocation is further based, at least in part, on the processing. By way of example, the coexistence platform 103 may determine that the at least one group shares information based, at least in part, one or more users of the group posting similar content about a band; that the at least one group moves together based, at least in part, on one or more members of the group attending a concert together; and that the at least one group shares one or more network resources based, at least in part, on one or more members of the group streaming multimedia content during the concert. Moreover, if the coexistence platform 103 determines a likelihood or an affirmation of the one or more parameters (e.g., sharing information), then the coexistence platform 103 determines that the social distance between the one or more users, the one or more devices, or a combination thereof is likely shorter or less than the social distance between two randomly selected users. Further, in one example use case, the coexistence platform 103 can determine that if one device (e.g., a mobile phone or a tablet) is paying for a number of other devices or one device is coordinating among a number of other devices (e.g., an SMS broadcast), then there is likely a short social distance between the device that is paying and/or coordinating and the one or more other devices that are receiving the benefit of such actions.

FIG. 4 depicts a server side process of causing, at least in part, at least one allocation of one or more radio resources to the one or more devices. In one embodiment, the coexistence platform 103 performs the process 400 and is implemented in, for instance, a chip set including a processor and a memory as shown in FIG. 8. In step 401, the coexistence platform 103 causes, at least on part, at least one allocation of one or more radio resources to the one or more devices based, at least in part, on the social distance information for the at least one group or a subset of the at least one group. By way of example, the one or more resources may include, at least in part, radio spectrum, channels, bandwidth, etc. Moreover, one or more connectivity providers (e.g., wireless service providers) can offer the one or more resources (e.g., available channels) to the at least one group, the users, or a combination thereof based, at least in part, on the social distance information. Consequently, the coexistence platform 103 can enable the one or more users to benefit terms of connectivity from belonging to at least one group (e.g., a fan club).

In step 403, the coexistence platform 103 determines contextual information associated with the at least one group, the one or more users, the one or more devices, the one or more radio resources, or a combination thereof, wherein the allocation is further based, at least in part, on the contextual information. More specifically, the contextual information includes, at least in part, location information, movement information, temporal information, activity information, or a combination thereof. As previously mentioned, in one example use case, members of a band's fan club may want to reserve one or more resources at a concert, for example, to download and/or stream multimedia content at the concert.

In step 405, the coexistence platform 103 causes, at least in part, a selection of at least one member of the at least one group. By way of example, the coexistence platform 103 may select the at least one member that the coexistence platform 103 determines has the shortest social distance (i.e., a certain quality and/or quantity of social connections) with the most members of the at least one group. Then in step 407, the coexistence platform 103 causes, at least in part, a reservation of the at least one allocation for the at least one member for sharing with one or more other members of the at least one group. In one example use case, the coexistence platform 103 may reserve one or more available channels and by facilitating a sharing of the at least one allocation, the coexistence platform 103 may make channel reservation more efficient compared to allocating one channel for only one device.

In step 409, the coexistence platform 103 causes, at least in part, an identification of the at least one group, the one or more users, the one or more devices, or a combination thereof, wherein the allocation is further based, at least in part, on the identification. As previously discussed, in one example use case, the one or more users of the at least one group may be members of a band fan club on one or more social networking services and are attending the band's concert as the same time. Because the coexistence platform 103 determines the social distance among the at least one group is relatively short (e.g. share information, travel as a group, etc.), the coexistence platform 103 can cause, at least in part, a transmission of more specific offerings to the at least one group (e.g., available channels for streaming multimedia content) relative to the general population.

In step 411, the coexistence platform 103 determines a request for the one or more radio resources (e.g., available spectrum, channels, bandwidth, etc.) from at least one member of the at least one group. In one example use case, the at least one member (e.g., of a fan club) may be requesting an available channel in order to stream multimedia content at a concert, for example. Then in step 413, the coexistence platform 103 can optionally determine that at least one other member of the at least one group has the at least one allocation. By way of example, coexistence platform 103 may have already allocated the one or more radio resources to the member of the fan club at the concert with the shortest social distance to the other members of the group. Further, in step 415, the coexistence platform 103 causes, at least in part, a presentation of a recommendation for the at least one member and the at least one other member to share the at least one allocation. For example, the coexistence platform 103 may cause, at least in part, a transmission of an SMS message to the at least one member and/or the at least one other member informing the members that that they can share the one or more radio resources (e.g., an available channel) by streaming multimedia content at different times from different devices.

In step 417, the coexistence platform 103 determines to limit an access to the one or more cognitive radio resources to the at least one group, the one or more users, the one or more devices, or a combination thereof. By way of example, the coexistence platform 103 can cause, at least in part, a transmission of one or more deals and/or offering from one or more connectivity providers (e.g., a wireless communication provider) based, at least in part, on a membership in a fan club or a payment of a premium for the one or more radio resources (e.g., available channels). Moreover, in one example use case, the coexistence platform 103 can determine that the first one hundred users, for example, of a plurality of one or more users that check-in or register (e.g., on one or more social networking services) at a particular venue (e.g., a concert) qualify for preferential treatment. Consequently, the coexistence platform 103 can then determine the at least one allocation based, at least in part, on the preferential treatment. In addition, it is contemplated that the coexistence platform 103 can also offer preferential treatment to the at least one group, the one or more users, or a combination thereof based, at least in part, on a willingness of the at least one group, the one or more users, or a combination thereof to spread out and/or share the one or more radio resources.

Figure 5:
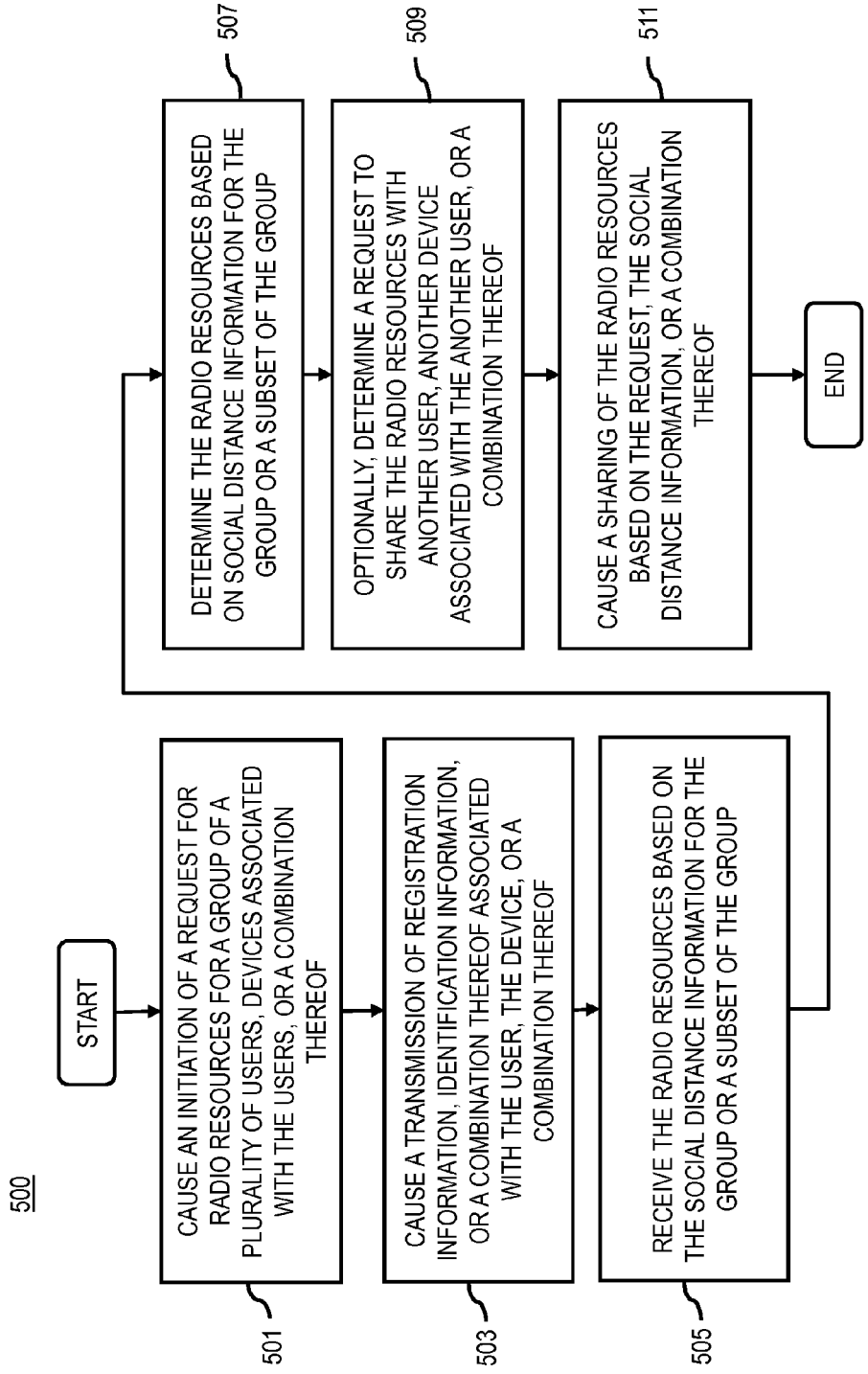
FIG. 5 is a flowchart of a client side process for determining radio resources based on social distance information for one or more social groups, according to one embodiment.

FIG. 5 is a flowchart of a client side process for determining radio resources (i.e., receiving and/or detecting available spectrum, channels, bandwidth, etc.) based on social distance information for one or more social groups, according to one embodiment. In one embodiment, the coexistence client 107 performs the process 500 and is implemented in, for instance, a chip set including a processor and a memory as shown in FIG. 8. In step 501, the coexistence client 107 causes, at least in part, an initiation of a request for at least one allocation of one or more radio resources for at least one group of a plurality of one or more users, one or more devices associated with the one or more users, or a combination thereof. By way of example, a user may initiate the request from his or her mobile device (e.g., a mobile phone or a tablet) at an event such as a concert or sporting event, where network resources (e.g., available bandwidth) are constrained or limited due to the large numbers of users attempting to use the same resources at or about the same time.

In step 503, the coexistence client 107 causes, at least in part, at least one transmission of registration information, identification information, or a combination thereof associated with the one or more users, the one or more devices, or a combination thereof, wherein the at least one allocation is based, at least in part, on the registration information, the identification information, or a combination thereof. By way of example, the registration information, the identification information, or a combination thereof may include, at least in part, a name, a device ID, a login and/or password associated with a social networking service, etc.

In step 505, wherein the radio resources are cognitive radio resources, the coexistence client 107 receives the one or more radio resources based, at least in part, on the social distance information for the at least one group or a subset of the at least one group. In one example use case, the social distance information may include registration information, identification information, or a combination thereof associated with a plurality of one or more members of a fan club on a social networking service, for example. Then in step 507, the coexistence client 107 determines the one or more radio resources based, at least in part, on social distance information for the at least one group or a subset of the at least one group (e.g., a degree of commonality among the at least one group or the subset of the at least one group). As previously discussed, the coexistence client 107 can determine the one or more radio resources by receiving and/or detecting available spectrum, channels, bandwidth, etc. In particular, in one use case example, the one or more radio resources may include, at least in part, exclusive or preferential access to the available spectrum, channels, bandwidth, etc. received, in part, from the coexistence platform 103.

In step 509, the coexistence client 107 optionally determines at least one other request to share one or more radio resources with at least one other user, at least one other device associated with the at least one other user, or a combination thereof. By way of example, the coexistence client 107 of a user device (e.g., a mobile device) can determine at least one request from the coexistence platform 103 and/or another coexistence client 107 (e.g., another user requesting an available channel to stream multimedia content at the same concert). Then in step 511, the coexistence client 107 causes, at least in part, at least one sharing of the one or more radio resources based, at least in part, on the social distance information (e.g., a degree of commonality among the one or more users, the at least one other user, or a combination thereof). For example, the coexistence client 107 may share the one or more radio resources based, at least in part, on a recommendation (e.g., a SMS message) from the coexistence platform 103 that one or more users share the one or more radio resources (e.g., by streaming multimedia content at different times from the different devices).

Figure 6B:
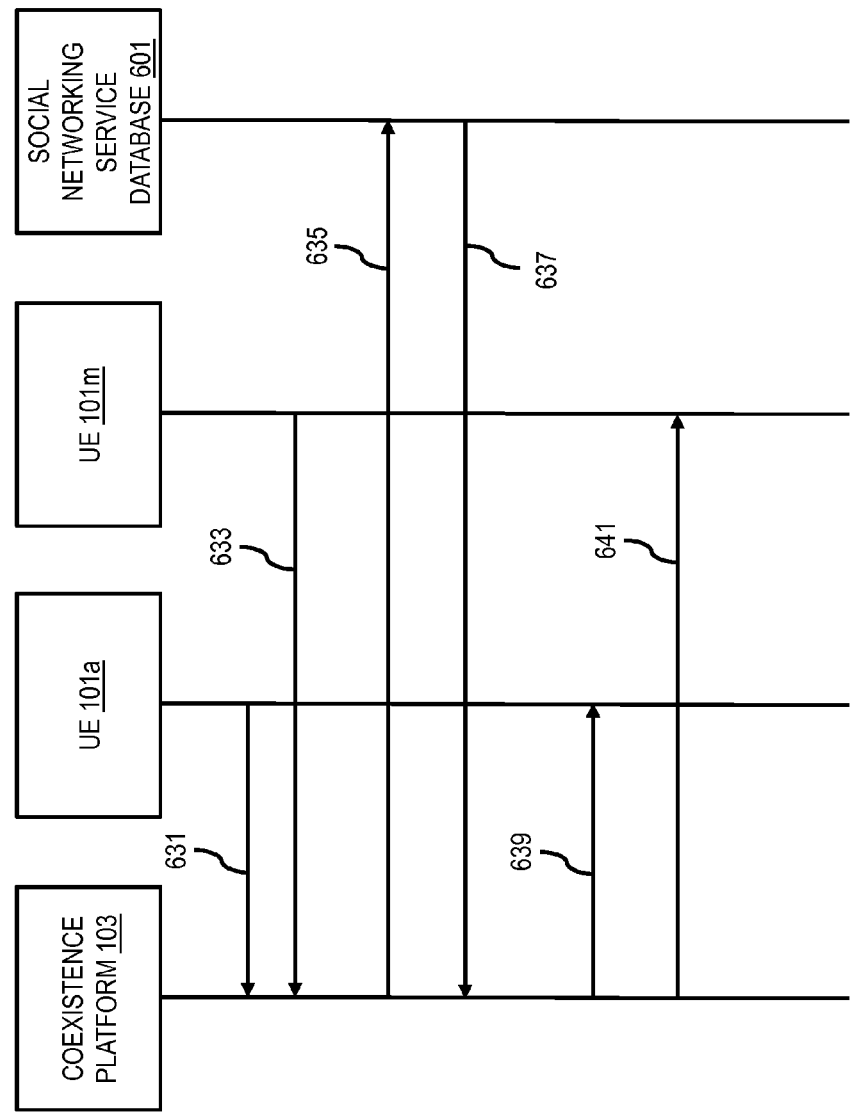

FIGS. 6A and 6B are ladder diagrams that illustrate a server side allocation of one or more radio resources (e.g., spectrum, channels, bandwidth, etc.) based on social distance information for one or more social groups, according to various embodiments. FIG. 6A depicts a server side sequence of messages and processes used in determining social distance and potentially allocating one or more radio resources based, at least in part, the social distance where one of the UEs 101 are already registered with the coexistence platform 103. More specifically, the processes in the diagram 600 include one or more UEs 101 (e.g., UE 101a and UE 101m), the coexistence platform 103, the cognitive radio database 111 (e.g., a white space database), and a social networking service database 601. In one example use case, the information stored in the social networking service database 601 (e.g., user credentials) could also be stored in the cognitive radio database 111 as well. A network process is represented by a thin vertical line. A step or message passed from one element to another is represented by horizontal arrows. In step 603, the coexistence platform 103 causes, at least in part, an identification of the UE 101a based, at least in part, on a determination by the coexistence platform 103 of registration and/or identification information associated with the UE 101a (e.g., a device identity). In step 605, the coexistence platform 103 causes, at least in part, a transmission of the registration and/or identification information associated with the UE 101a to the cognitive radio database 111. Next, in step 607, the coexistence platform 103 determines one or more rules and/or relations (e.g., time, place, frequency, etc.) related to potentially useable frequencies or channels. In step 609, the coexistence platform 103 determines a request for one or more radio resources from the UE 101m (e.g., spectrum, channels, bandwidth, etc.) and corresponding registration information, identification information, or a combination thereof associated with the UE 101m (e.g., a login and/or password associated with the social networking service database 601).

In step 611, the coexistence platform 103 attempts to determine the social distance information for at least one group of a plurality of one or more users, the one or more devices (e.g., UE 101a and UE 101m) associated with the one or more users, or a combination thereof. In particular, the coexistence platform 103 causes, at least in part, an extraction of the one or more features of the at least one group from the social networking service database 601 associated with the at least one group, the one or more users, the one or more devices, or a combination thereof. As previously discussed, one of the main characteristics of commonality within any given group (i.e., a short social distance) is a certain feature or characteristic. More specifically, the one or more datasets determined by the coexistence platform 103 from the feature extraction include, at least in part, one or more reference datasets (e.g., trend extraction), one or more social datasets (e.g., social relationships, social networking relationships, etc.), one or more personal datasets (e.g., user identity, user credentials, etc.), one or more behavioral datasets (e.g., just-in-time updates), or a combination thereof associated with the UE 101m and stored in the social networking service database 601. In step 613, if the coexistence platform 103 is unable to determine one or more similar datasets (e.g., social datasets) associated with the UE 101a, then it is contemplated that the coexistence platform 103 will determine that the social distance between the UE 101a and the UE 101m is considerable. In contrast, if the coexistence platform 103 determines in step 613 that the short social distance between the UE 101a and the UE 101m is short (e.g., both associated with a fan club on the social networking service), the coexistence platform in step 615 can cause, at least in part, at least one allocation of one or more radio resources (e.g., spectrum, channels, bandwidth, etc.) to UE 101m based, at least in part, on the social distance information.

FIG. 6B depicts a server side sequence of messages and processes used in determining social distance and potentially allocating one or more radio resources (e.g., spectrum, channels, bandwidth, etc.) based, at least in part, on the social distance where none of the UEs 101 have previously registered with the coexistence platform 103. The processes in the diagram 630 also include one or more UEs 101 (e.g., UE 101a and UE 101m), the coexistence platform 103, and a social networking service database 601. In steps 631 and 633, the coexistence platform 103 causes, at least in part, an identification of the UEs 101 (e.g., the UE 101a and the UE 101m) based, at least in part, on registration and/or identification information associated with the UEs 101 (e.g., respective device identities). Then in step 635, the coexistence platform 103 attempts to determine the social distance between the UE 101a and the UE 101m from the social networking service database 601. As previously discussed, if the coexistence platform 103 is unable to determine one or more similar datasets (e.g., social datasets) associated with the UEs 101 in step 637, then it is contemplated that the coexistence platform 103 will determine that the social distance between the UE 101a and the UE 101m is considerable. In contrast, if the coexistence platform 103 determines in step 637 that the social distance between the UE 101a and the UE 101m is short (e.g., both associated with a fan club on the social networking service), the coexistence platform 103 can cause, at least in part, at least one allocation of one or more radio resources (e.g., spectrum, channels, bandwidth, etc.) to UE 101a and the UE 101m in steps 639 and 641, respectively, based, at least in part, on the social distance information.

FIG. 7 is a diagram of user interfaces utilized in the server side processes of FIGS. 3 and 4, according to various embodiments. As shown, the example user interfaces of FIG. 7 include one or more user interface elements and/or functionalities created and/or modified based, at least in part, on information, data, and/or signals resulting from the server side processes (e.g., processes 300 and 400) described with respect to FIGS. 3 and 4. More specifically, FIG. 7 illustrates two user interfaces (e.g., interfaces 701 and 703) belonging to a user attempting to stream multimedia content during a crowded concert. More specifically, in this example use case, the one or more radio resources (e.g., spectrum, channels, bandwidth, etc.) are considerably limited as depicted by the signal strength 705, the empty progress bar 707, and the error message 709 "Error! Insufficient resources."

In one embodiment, once a user selects the interface element 711 "Click to request additional resources," the system 100 determines the request of the user of interfaces 701 and 703 and then determines the social distance information for at least one group of a plurality of one or more users, one or more devices associated with the one more users (e.g., interfaces 701 and 703), or a combination thereof. As previously discussed, the at least one group may include members of one or more social networking services, members of one or more groups on the one or more social networking services (e.g., a fan club), members of a music fan club, etc. In one or more embodiments, the system 100 next causes, at least in part, an extraction of one or more features of the at least one group (e.g., the user of interfaces of 701 and 703 and one or more other users present at the concert) from one or more datasets associated with the at least one group, the one or more users, the one or more devices (e.g., the interfaces 701 and 703), or a combination thereof. In one embodiment, once the system 100 extracts the one or more features, the system 100 can determine the social distance information based, at least in part, on the one or more features, the one or more datasets, or a combination thereof. More specifically, the one or more datasets determined by the system 100 from the feature extraction include, at least in part, one or more reference datasets, one or more social datasets, one or more personal datasets, one or more behavioral datasets, or a combination thereof.

In this example use case, the system 100 determines that one or more friends or colleagues of the user of interfaces 701 and 703 are also present at the concert and that the social distance among the group is short (e.g., the one or more users all belong to the same fan club on one or more social networking services). In certain embodiments, the system 100 next causes, at least in part, at least one allocation of one or more radio resources (e.g., spectrum, channels, bandwidth, etc.) to interfaces 701 and 703, for example, based, at least in part, on the social distance information for the at least one group (e.g., one or more social networking services) or a subset of the at least one group (e.g., the fan club). In this example use case, the system 100 can determine that at least one other member of the at least one group already has the at least one allocation (e.g., the member of the fan club at the concert with the shortest social distance to the other members of the group). Consequently, in one embodiment, the system 100 can then cause, at least in part, a presentation of a recommendation (e.g., notification 715 "Click to share resources") for the user of the interfaces 701 and 703 and the at least one other member to share the at least one allocation. As a result of the user of interfaces 701 and 703 agreeing to share the at least one allocation, the user is able to stream the multimedia content as depicted by the increase of the signal strength indicator 705 and the progress bar 707.

The processes described herein for allocating radio resources (e.g., spectrum, channels, bandwidth, etc.) based on social distance information for one or more social groups may be advantageously implemented via software, hardware, firmware or a combination of software and/or firmware and/ or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to allocate radio resources based on social distance information for one or more social groups as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of allocating radio resources based on social distance information for one or more social groups.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to allocate radio resources based on social distance information for one or more social groups. The computer program code is a set of instructions or statements providing instructions for the operation of the processor and/ or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for allocating radio resources based on social distance information for one or more social groups. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for allocating radio resources based on social distance information for one or more social groups, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for allocating radio resources based on social distance information for one or more social groups to the UEs 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
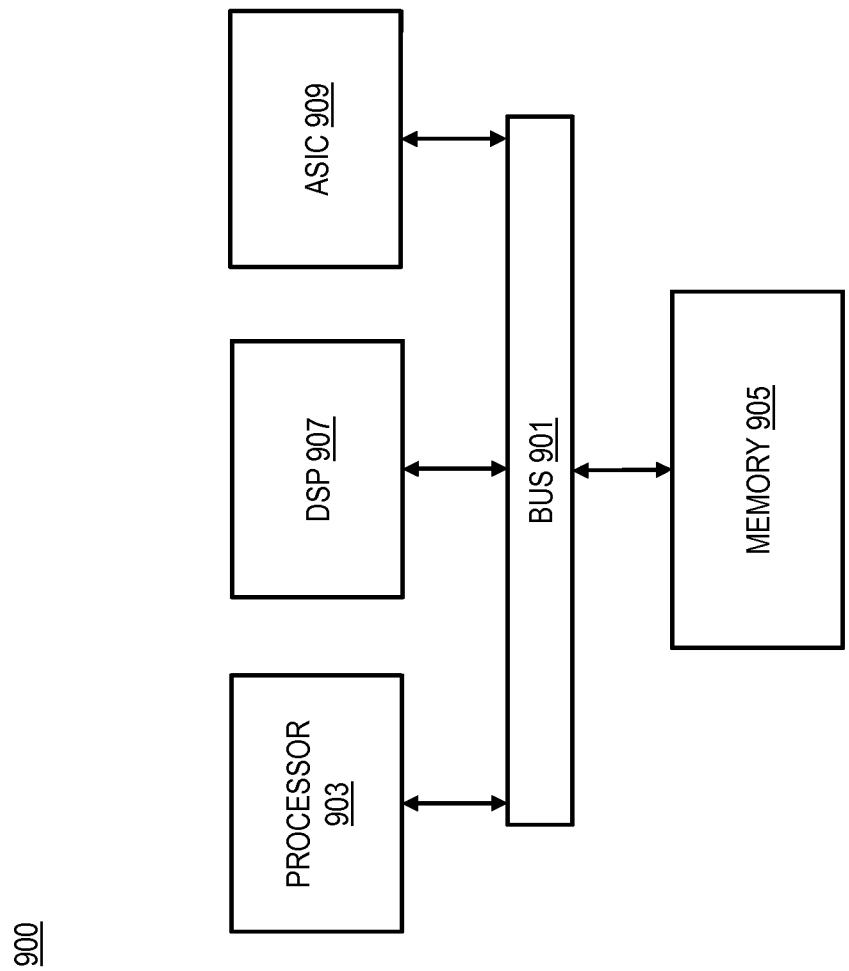
FIG. 9 is a diagram of a chip set that can be used to implement an embodiment of the invention.

FIG. 9 illustrates a chip set or chip 900 upon which an embodiment of the invention may be implemented. Chip set 900 is programmed to allocate radio resources based on social distance information for one or more social groups as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of allocating radio resources based on social distance information for one or more social groups.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to allocate radio resources based on social distance information for one or more social groups. The memory 905 also stores the data associated with or generated by the execution of the inventive steps.

Figure 10:
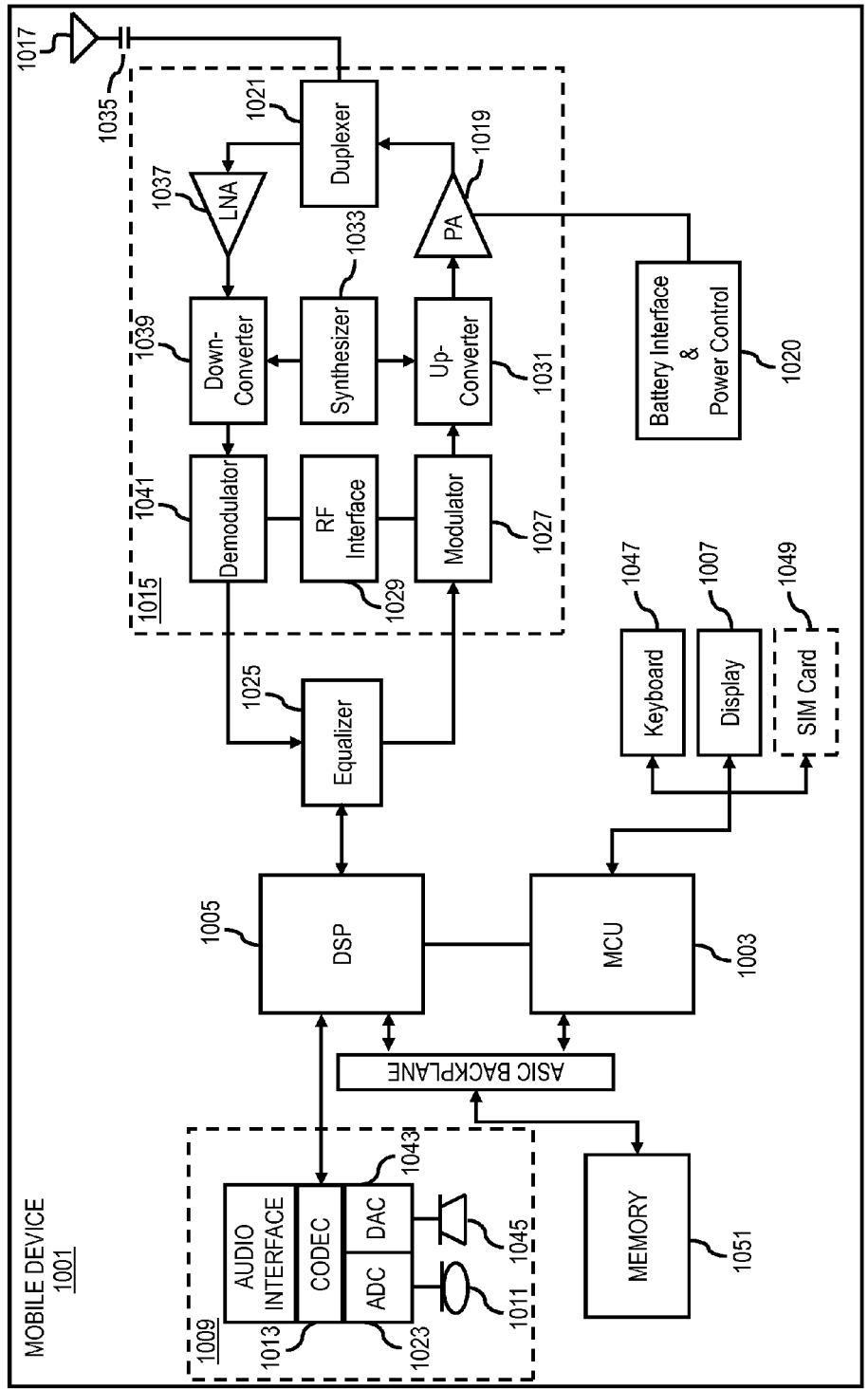
FIG. 10 is a diagram of a mobile device that can be used to implement an embodiment of the invention.

FIG. 10 is a diagram of exemplary components of a mobile device (e.g., mobile terminal, mobile phone, handset, etc.) for communications, which is capable of operating in the system of FIGS. 1A and 1B, according to one embodiment. In some embodiments, mobile terminal 1001, or a portion thereof, constitutes a means for performing one or more steps of allocating radio resources based on social distance information for one or more social groups. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor (s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of allocating radio resources based on social distance information for one or more social groups. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to allocate radio resources based on social distance information for one or more social groups. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, with a processor, social distance information for at least one group of a plurality of one or more users, one or more devices associated with the one or more users, or a combination thereof, wherein the social distance information comprises a likelihood that the at least one group shares social information, a likelihood that the at least one group moves together, a likelihood that the at least one group shares one or more network services, or a combination thereof;
   determining from the social distance information that at least one user of the at least one group has a shortest social distance to a majority of users of the at least one group wherein the shortest social distance is measured by, at least in part, a quality or quantity of social connections with the majority of users of the at least one group; and
   allocating one or more radio resources for the at least one user of the at least one group with the shortest social distance for sharing the one or more radio resources with the one or more devices based, at least in part, on the social distance information including the social distance for the at least one group or a subset of the at least one group.

2. The method of claim 1 further comprising:
   extracting one or more features of the at least one group from one or more datasets associated with the at least one group, the one or more users, the one or more devices, or a combination thereof, wherein determining the social distance information is based, at least in part, on the one or more features, the one or more datasets, or a combination thereof.

3. The method of claim 2, wherein the one or more radio resources include, at least in part, one or more cognitive radio resources, and wherein the one or more datasets include, at least in part, one or more reference datasets, one more social datasets, one or more personal datasets, one or more behavioral datasets, or a combination thereof.

4. The method of claim 1 further comprising:
determining contextual information associated with the at least one group, the one or more users, the one or more devices, the one or more radio resources, or a combination thereof,
wherein the allocation is further based, at least in part, on the contextual information.

5. The method of claim 4, wherein the contextual information includes, at least in part, location information, movement information, temporal information, activity information, or a combination thereof.

6. The method of claim 1 further comprising:
identifying the at least one group, the one or more users, the one or more devices, or a combination thereof,
wherein the allocation is further based, at least in part, on the identification.

7. The method of claim 1 further comprising:
causing, at least in part, a reservation of at least one allocation of one or more radio resources for the at least one user for sharing with the at least one group.

8. A method comprising:
initiating a request for at least one allocation of one or more radio resources for at least one group of a plurality of one or more users, one or more devices with the one or more users, or a combination thereof;
determining, with a processor, the one or more radio resources based, at least in part, on social distance information for the at least one group or a subset of the at least one group, wherein the social distance information comprises a likelihood that the at least one group shares social information, a likelihood that the at least one group moves together, a likelihood that the at least one group shares one or more network services, or a combination thereof; and
receiving the one or more radio resources based, at least in part, on the social distance information for the at least one group or the subset of the at least one group wherein the social distance information is measured by a quality or quantity of social connections with a majority of users of the at least one group or the subset of the at least one group.

9. The method of claim 8 further comprising:
causing the transmission of registration information, identification information, or a combination thereof associated with the one or more users, the one or more devices, or a combination thereof,
wherein the social distance information is based, at least in part, on the registration information, the identification information, or a combination thereof.

10. The method of claim 8 further comprising:
determining at least one other request to share the one or more radio resources with at least one other user, at least one other device associated with the at least one other user, or a combination thereof; and
sharing the one or more radio resources based, at least in part, on the at least one request, the social distance information, or a combination thereof.

11. The method of claim 8, wherein receiving the one or more radio resources includes, at least in part, exclusive or preferential access to the one or more radio resources.

12. An apparatus comprising:
at least one processor; and
at least one memory including computer program code for one or more programs, the at least one memory and the computer program code configured to, with the at least one processor, cause the apparatus to perform at least the following:
determine social distance information for at least one group of a plurality of one or more users, one or more devices associated with the one or more users, or a combination thereof, wherein the social distance information comprises a likelihood that the at least one group shares social information, a likelihood that the at least one group moves together, a likelihood that the at least one group shares one or more network services, or a combination thereof;
determine from the social distance information that at least one user of the at least one group has a shortest social distance to a majority of users of the at least one group wherein the shortest social distance is measured by, at least in part, a quality or quantity of social connections with the majority of users of the at least one group; and
cause, at least in part, at least one allocation of one or more radio resources for the at least one user of the at least one group with the shortest social distance for sharing the one or more radio resources with the one or more devices based, at least in part, on the social distance information including the social distance for the at least one group or a subset of the at least one group.

13. The apparatus of claim 12, wherein the apparatus is further caused to:
cause, at least in part, an extraction of one or more features of the at least one group from one or more datasets associated with the at least one group, the one or more users, the one or more devices, or a combination thereof; and
determine the social distance information based, at least in part, on the one or more features, the one or more datasets, or a combination thereof.

14. The apparatus of claim 13, wherein the one or more radio resources are cognitive radio resources, and wherein the one or more datasets include, at least in part, one or more reference datasets, one more social datasets, one or more personal datasets, one or more behavioral datasets, or a combination thereof.

15. The apparatus of claim 12, wherein the apparatus is further caused to:
determine contextual information associated with the at least one group, the one or more users, the one or more devices, the one or more radio resources, or a combination thereof,
wherein the allocation is further based, at least in part, on the contextual information.

16. The apparatus of claim 15, wherein the contextual information includes, at least in part, location information, movement information, temporal information, activity information, or a combination thereof.

17. The apparatus of claim 12, wherein the apparatus is further caused to:
cause, at least in part, an identification of the at least one group, the one or more users, the one or more devices, or a combination thereof,
wherein the allocation is further based, at least in part, on the identification.

18. An apparatus of claim 12, wherein the apparatus is further caused to:
cause, at least in part, a reservation of at least one allocation of one or more radio resources for the at least one user for sharing with the at least one group.

19. An apparatus comprising:
at least one processor; and at least one memory including computer program code for one or more programs, the at least one memory and the computer program code configured to, with the at least one processor, cause the apparatus to perform at least the following, cause, at least in part, an initiation of a request for at least one allocation of one or more radio resources for at least one group of a plurality of one or more users, one or more devices associated with the one or more users, or a combination thereof;

determine the one or more radio resources based, at least in part, on social distance information for the at least one group or a subset of the at least one group, wherein the social distance information comprises a likelihood that the at least one group shares social information, a likelihood that the at least one group moves together, a likelihood that the at least one group shares one or more network services, or a combination thereof; and receive the one or more radio resources based, at least in part, on the social distance information for the at least one group or the subset of the at least one group wherein the social distance information is measured by a quality or quantity of social connections with a majority of users of the at least one group or the subset of the at least one group.

20. The apparatus of claim 19, wherein the apparatus is further caused to:

cause, at least in part, at least one transmission of registration information, identification information, or a combination thereof associated with the one or more users, the one or more devices, or a combination thereof, wherein the social distance information is based, at least in part, on the registration information, the identification information, or a combination thereof.

21. The apparatus of claim 19, wherein the apparatus is further caused to:

determine at least one other request to share one or more radio resources with at least one other user, at least one other device associated with the one other user, or a combination thereof and cause, at least in part, at least one sharing of the one or more radio resources based, at least in part, on the at least one request, the social distance information, or a combination thereof.

22. The apparatus of claim 19, wherein receiving the one or more radio resources includes, at least in part, exclusive or preferential access to the one or more radio resources.

* * * * *